US011106208B2

(12) United States Patent
Alshamrani et al.

(10) Patent No.: US 11,106,208 B2
(45) Date of Patent: Aug. 31, 2021

(54) BUILDING QUALITY INSPECTION SYSTEM AND INSPECTION ROBOT

(71) Applicant: Imam Abdulrahman Bin Faisal University, Dammam (SA)

(72) Inventors: Othman Alshamrani, Dammam (SA); Meqdad Hasan, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 230 days.

(21) Appl. No.: 16/030,901

(22) Filed: Jul. 10, 2018

(65) Prior Publication Data

US 2020/0019167 A1    Jan. 16, 2020

(51) Int. Cl.
| | |
|---|---|
| *G05D 1/00* | (2006.01) |
| *G01N 29/22* | (2006.01) |
| *G01N 19/08* | (2006.01) |
| *G06K 9/00* | (2006.01) |
| *G06K 7/14* | (2006.01) |
| *G05D 1/10* | (2006.01) |
| *B25J 5/00* | (2006.01) |

(52) U.S. Cl.
CPC .......... *G05D 1/0094* (2013.01); *G01N 19/08* (2013.01); *G01N 29/226* (2013.01); *G05D 1/101* (2013.01); *G06K 7/1417* (2013.01); *G06K 9/00691* (2013.01); *B25J 5/007* (2013.01)

(58) Field of Classification Search
CPC ....... B25J 5/007; G01N 19/08; G01N 29/226; G01N 2291/0232; G01N 29/045; G05D 1/0094; G05D 1/101; G06K 7/1417; G06K 9/00691; G01M 5/00
See application file for complete search history.

(56) References Cited

U.S. PATENT DOCUMENTS

| | | | |
|---|---|---|---|
| 2004/0073337 A1 | 4/2004 | McKee et al. | |
| 2009/0265193 A1* | 10/2009 | Collins | G06Q 30/0185 705/4 |
| 2012/0173070 A1* | 7/2012 | Schnittman | G05D 1/027 701/26 |

(Continued)

FOREIGN PATENT DOCUMENTS

| | | |
|---|---|---|
| EP | 0 674 974 A1 | 10/1995 |
| WO | 2016/073698 A1 | 5/2016 |

*Primary Examiner* — Hunter B Lonsberry
*Assistant Examiner* — Matthew J. Reda
(74) *Attorney, Agent, or Firm* — Oblon, McClelland, Maier & Neustadt, L.L.P.

(57) ABSTRACT

A building quality inspection system includes a controller, a drone, and a robot that are communicably connected to one another. The controller includes circuitry configured to, when exterior of a building is inspected, sends an inspection objective to the drone to instruct the drone to carry out a visual inspection of the exterior of the building, receives inspection data collected by the drone during the visual inspection of the exterior of the building, extracts a location where damage is suspected from the inspection data collected by the drone, sends the location where damage is suspected to the robot to carry out an exterior inspection at the location where damage is suspected, receives inspection data collected by the robot during the exterior inspection, and determines current quality of the exterior of the building based on the inspection data collected by the drone and the robot.

14 Claims, 20 Drawing Sheets

(56) References Cited

U.S. PATENT DOCUMENTS

| | | |
|---|---|---|
| 2015/0052703 A1 | 2/2015 | Lee et al. |
| 2016/0320774 A1* | 11/2016 | Kuhara ................ G05D 1/0287 |
| 2016/0378105 A1* | 12/2016 | Tanigawa ............. B25J 11/0085 |
| | | 134/18 |
| 2017/0199647 A1* | 7/2017 | Richman ........ G06Q 10/063114 |
| 2018/0151045 A1* | 5/2018 | Kim ................... G08B 13/1965 |
| 2018/0189705 A1* | 7/2018 | Nonaka ..................... G06T 7/97 |
| 2019/0066488 A1* | 2/2019 | Locke .................. G08B 25/007 |
| 2019/0094124 A1* | 3/2019 | Amer .................... G06N 3/0445 |
| 2019/0161103 A1* | 5/2019 | Venkatasubramanian ................... G05D 1/0094 |
| 2019/0320859 A1* | 10/2019 | Bofill .................... E04G 23/002 |
| 2019/0325668 A1* | 10/2019 | Cole ........................ G01N 1/22 |

* cited by examiner

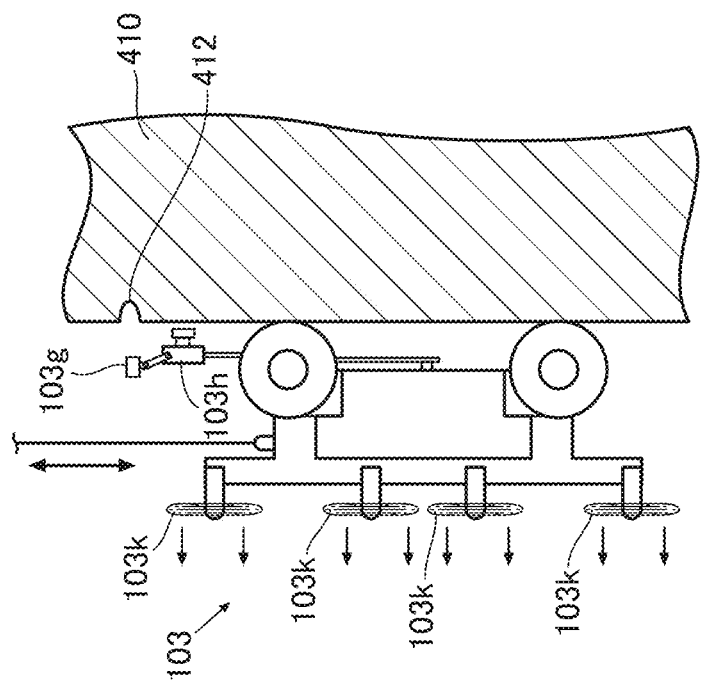
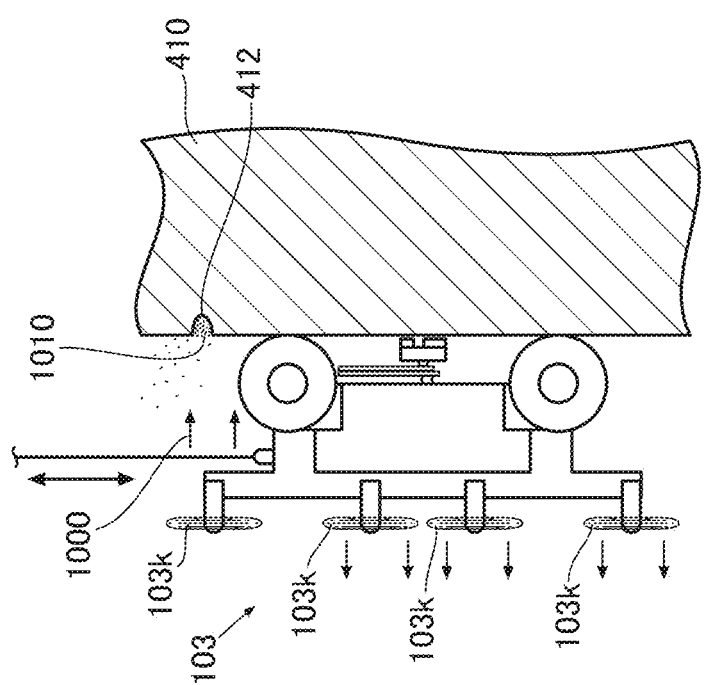
Fig. 10A
Fig. 10B

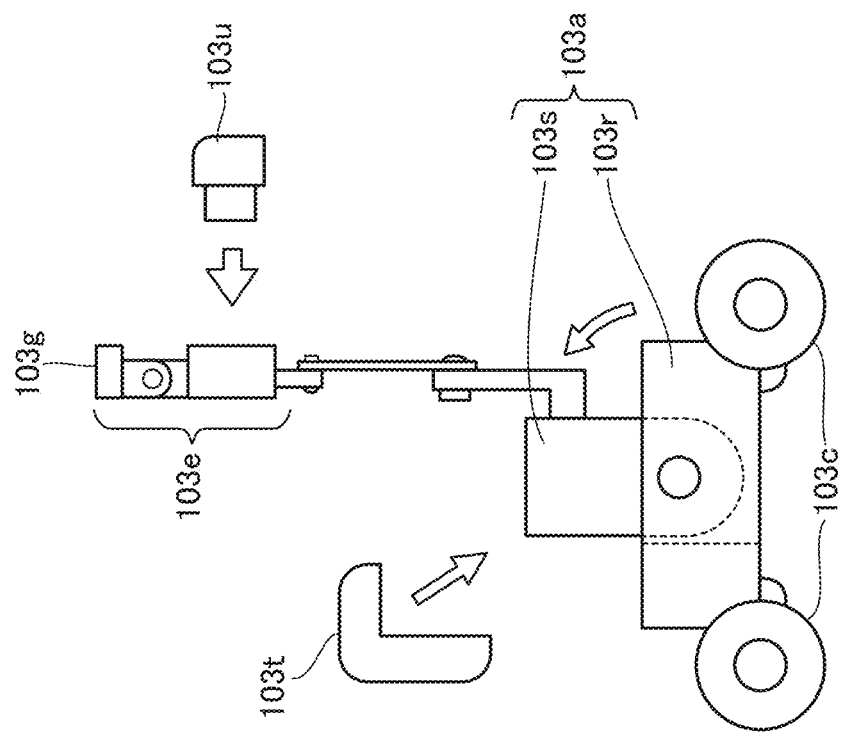
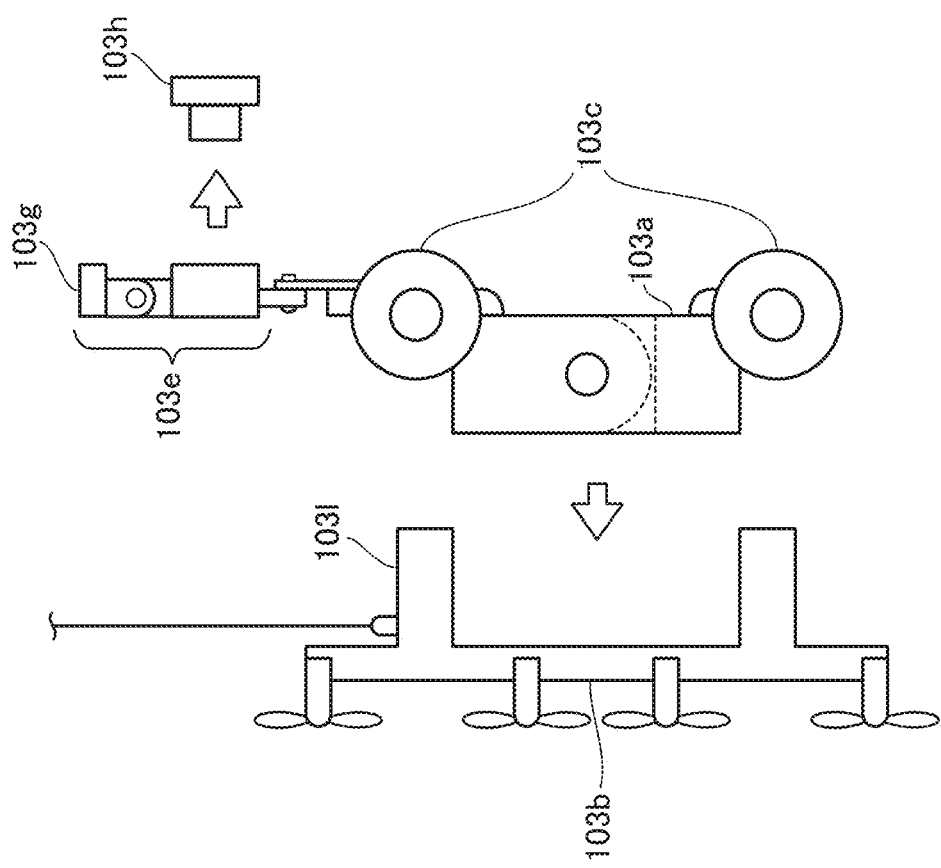

BUILDING QUALITY INSPECTION SYSTEM AND INSPECTION ROBOT

BACKGROUND

Technical Field

The present disclosure is directed to a building quality inspection system and a robot for inspecting exterior and indoor environments of a building.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As buildings deteriorate with age, the importance of building inspections and maintenance of buildings based on results of the building inspection increases. However, in many cases, the inspection is performed manually by human inspectors. This is costly and takes long time. On the other hand, recent developments in fields of aerial drones and robots are an eye-opener, and there is an increasing demand for use of aerial drones and robots to improve the efficiency and accuracy of inspection work, thereby saving cost and labor of inspection and maintenance of buildings. Many aspects of modern infrastructure other than conventional human-occupied buildings can likewise benefit from automated and control-enhanced inspection of interior and exterior environments. For example structures such as energy generating windmills are subject to the extreme forces of weather and the environment. Exposed surfaces of such structures are often not easily accessible and may be difficult to view or inspect. At the same time the interior environments of such structures need to be controlled and/or monitored in order to ensure optimal or acceptable operating conditions. For example, the energy-generating devices that are located at the top of windmills may experience significant temperature variations depending on exposure to sun and ambient conditions. Ordinarily the equipment housed within such structures must be protected by shading, insulation and other forms of shelter to stabilize the interior environment and corresponding interior environment. Often such structures are overbuilt in an effort to secure a stable interior environment. This of course adds to the cost of manufacture, cost of installation and cost of maintenance for such structures. Moreover, it is difficult to obtain a dynamic perspective of the environmental conditions and performance characteristics of these aspects of structures.

Many interior and exterior environmental conditions affect the health and well-being of individuals present within the human-occupied buildings. Environmental factors such as exposure to sunlight, differential between interior and exterior temperatures, lighting, and air quality may significantly impact the human comfort level in the interior spaces of buildings such as classrooms, offices, hospitals and homes. Hospitals and clinics have special environmental and safety concerns that require monitoring and control of environmental conditions. Especially in hospitals, dynamic monitoring of interior spaces for pathogens, allergens and odors is critical in order to ensure a safe and comfortable working environment for patient recovery.

SUMMARY

According to one aspect of the present disclosure, a building quality inspection system for inspecting the exterior and/or indoor environments of a building is provided. The system includes a controller, a drone, and a robot that are communicably connected to one another. The controller includes circuitry configured to, when an exterior of a building is inspected, send an inspection objective to the drone to instruct the drone to carry out a visual inspection of the exterior of the building and/or the environment outside the building, receive inspection data collected by the drone during the visual inspection of the exterior of the building and/or environment, receive inspection data collected by the drone during the exterior inspection, and determine one or more human comfort of environmental quality attributes of the exterior of the building and/or environment based on the inspection data collected by the drone. The circuitry is further configured to, when indoor of a building is inspected, sends an inspection objective to the robot to instruct the robot to carry out an inspection of the interior of the building, receive inspection data collected by the robot during the indoor inspection, and determines one or more human comfort or environmental quality attributes of the interior of the building based on the inspection data collected by the robot.

In another aspect of the present disclosure, a building quality inspection system for inspecting the exterior and/or interior environments of a building is provided. The system includes a controller, a drone, and a robot that are communicably connected to one another. The controller includes circuitry configured to, when an exterior of a building is inspected, send an inspection objective to the drone to instruct the drone to carry out a visual inspection of the exterior of the building and/or the environment outside the building, receive inspection data collected by the drone during the visual inspection of the exterior of the building and/or environment, extract a location where damage is suspected from the inspection data collected by the drone, send the location where damage is suspected to the robot to carry out an exterior inspection at the location where damage is suspected, receive inspection data collected by the robot during the exterior inspection, and determines current quality of the exterior of the building based on the inspection data collected by the drone and the robot. The circuitry is further configured to, when the interior of a building is inspected, send an inspection objective to the robot to instruct the robot to carry out an inspection of the interior of the building, receives inspection data collected by the robot during the indoor inspection, and determine current quality of the interior of the building based on the inspection data collected by the robot.

According to another aspect of the present disclosure, a robot for inspecting the exterior and interior of a building is provided. The robot includes: an inspection sensor configured to measure one or more parameters; a base portion including wheels for movement; a foldable portion pivotally mounted on the base portion; and a holding arm attached to the foldable portion and configured to hold the inspection sensor and change a position of the inspection sensor with respect to the foldable portion. Further, when exterior of a building is inspected, the foldable portion is folded in such a way that a surface of the exterior of the building is reachable by the inspection sensor, and when the interior of a building is inspected, the foldable portion is lifted to enable the holding arm to change height of the inspection sensor from a floor of the building.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10A is a side view of the robot for exterior inspection during a dust removing operation;

FIG. 10B is a side view of the robot for exterior inspection during the dust removing operation;

FIG. 13A is a schematic diagram illustrating how a robot for exterior inspection is transformed into a robot for indoor inspection;

FIG. 13B is a schematic diagram illustrating how a robot for exterior inspection is transformed into a robot for indoor inspection;

DETAILED DESCRIPTION

Figure 1:
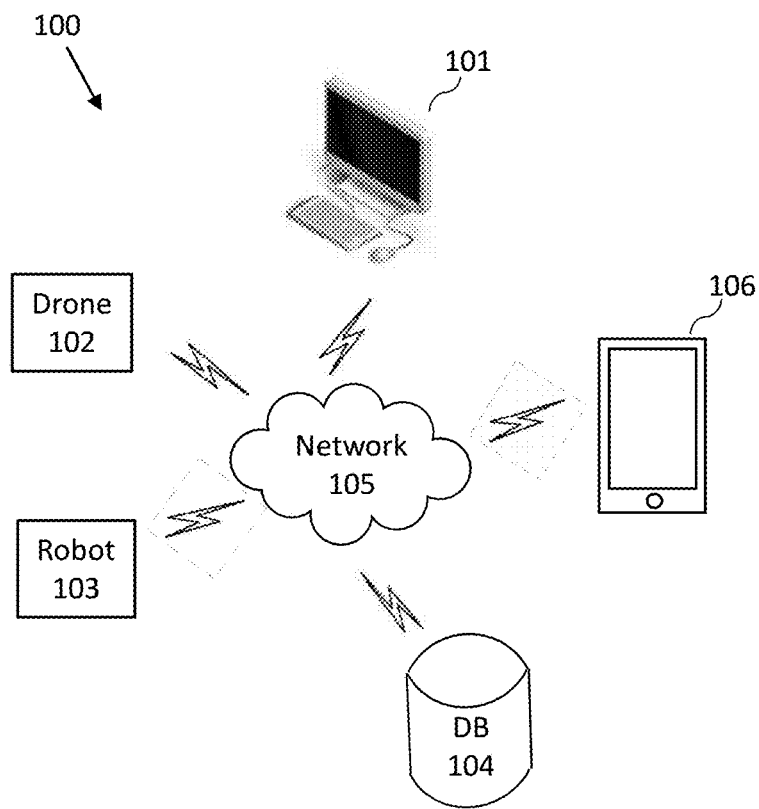
FIG. 1 is a schematic diagram of a building quality inspection system according to one embodiment.

In the drawings, like reference numerals designate identical or corresponding parts throughout the several views.

Further, as used herein, the words "a," "an" and the like generally carry a meaning of "one or more," unless stated otherwise. The drawings are generally drawn to scale unless specified otherwise or illustrating schematic structures or flowcharts.

A building quality inspection system according to certain embodiments of the present disclosure inspects the exterior or indoor of a building to determine current quality of the building. In the building quality inspection system, inspections are performed while efficiently utilizing a drone and a robot for different types of inspection, namely, the exterior inspection and the indoor inspection. Specifically, targets of the inspection include, for example, an office building, a residential building, a school, a hospital, a facility, a factory, or any special purpose structure such as a bridge, a wind turbine, an electrical tower, an oil/gas rig, and the like. The exterior of a building may include any part of exterior wall of the building, and the indoor of a building may include one or more rooms in the building.

The exterior environment of a building or structure generally includes the space in the immediate vicinity of the structure. For example, the exterior environment of a hospital includes (i) the ground surfaces surrounding the hospital on which the hospital structure is built, (ii) the air space surrounding all exterior portions of the building including any horizontal, vertical or slanted outside-exposed surfaces and (iii) the effects of weather including exposure to sun, shading by other structures including both man-made and natural objects, and wind-borne materials including, for example, particulate matter in solid form (sand, and microparticles) and liquid materials (for example saltwater spray). In addition the exterior airspace may include a variety of pollutants or other non-naturally occurring compounds that have the potential to generally affect the physical condition of the exterior portions of the structure and/or affect the interior portion of the structure by ingress through openings such as doors, windows, voids and crevices, or enter adventitiously through sources such as ventilation equipment. The exterior environment may also include the effects of neighboring objects due to, for example, thermal mass, thermal radiation, solar and visible light reflection. In addition, the exterior environment may includes both audible and inaudible noises and vibrations.

The interior environment of the building may include one or more of the factors noted above for the exterior environment, however, occuring primarily in the interior of a building. For example, aspects of human comfort such as temperature, airflow, noise level, thermal radiation, air quality (air purity) and light level are all factors that are included in the interior environment consideration.

Interior and exterior environments may be directly or indirectly connected or responsive to one another. An exterior environment that subjects a building to significant solar radiation, sunlight or thermal radiation will generally breach the exterior portions of the building and affect also the interior portions of the building. As surfaces of exterior portions of the building such as walls and roofs become hot, the heat will gradually cause an increase in the temperature of the interior of the building depending on the efficiency of any insulation. In addition, solar radiation entering as light, especially infrared light, through windows or other light permissive areas may further cause an increase in temperature or have other effects on the interior of a building. Other exterior conditions such as air quality have a direct impact and effect on the condition of the corresponding interior space of the building. Pollutants or wind-borne particulate matter may enter a building by crossing barriers intended to exclude such environmental conditions or gain access through voids or temporary breaches of interior/exterior barrier (e.g., door openings).

FIG. 1 is a schematic diagram of a building quality inspection system 100 according to one embodiment of the present disclosure. The building quality inspection system 100 includes an inspection operation controller 101, a drone 102, a robot 103, and a database 104. The inspection operation controller 101, the drone 102, the robot 103, and the database 104 are communicably connected to one another via a network 105. FIG. 1 also depicts a user terminal 106 wirelessly connected to the building quality inspection system 100 via the network 105.

The inspection operation controller 101 is a device to control the operation of the building quality inspection system 100. The inspection operation controller 101 includes processing circuitry that receives input regarding an inspection to be performed from a user, sets an inspection objective based on the user input, sends the inspection objective to either the drone 102 or the robot 103 depending on the type of inspection, receives inspection data collected by the drone 102 or the robot 103 during the inspection, analyzes the collected inspection data, and determines current quality of a building from the collected inspection data.

The inspection operation controller 101 may be a computer including a processor and a memory storing instructions to be executed by the processor to implements an inspection control process for controlling the operation of the building quality inspection system 100. The computer may be a desktop computer, a laptop computer, a tablet, or a server connected to the network 140. Details regarding the inspection operation controller 101 are discussed further herein with reference to FIG. 2 and FIG. 3.

The drone 102 is an unmanned aerial inspection device equipped with one or more sensors for visual inspection. The drone 102 in FIG. 1 represents one or more drones having the identical configuration. The drone 102 receives an inspection objective assigned thereto from the inspection operation controller 101 and autonomously carries out a visual inspection of the exterior of a building.

The robot 103 is an unmanned self-propelled inspection device equipped with one or more sensors for inspecting the exterior or indoor of a building. The robot 103 of FIG. 1 represents one or more robots having the identical configuration. The robot 103 receives an inspection objective assigned thereto from the inspection operation controller 101 and autonomously carries out an exterior inspection or an indoor inspection of a building. Details regarding the drone 102 and the robot 103 are discussed further herein.

The database 104 represents one or more databases connected to the inspection operation controller 101 via the network 104 and stores structural data such as schematic of a building, a floor plan of each room in a building, and the like. The database 104 may further store data collected in the past inspections and results of past data analysis performed on that data.

The network 105 can be a public network, such as the Internet, or a private network such as an LAN or WAN network, or any combination thereof and can also include PSTN or ISDN sub-networks. The network 105 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

In the building quality inspection system 100, the inspection operation controller 101 receives input regarding an inspection to be performed from a user directly or from the user terminal 106 via the network 105 and sends an inspection objective to the drone 102 or the robot 103 depending on whether the exterior or indoor of a building is to be inspected. The inspection objective includes the location and structure data of a building to be inspected when the exterior of a building is to be inspected and includes the location and structure data of one or more rooms in a building to be inspected when the indoor of a building is to be inspected.

In a case where the exterior of a building is inspected, both the drone 102 and the robot 103 may be used. In this case, the drone 102 visually inspects the exterior of a building from air and returns data collected during the inspection. The inspection operation controller 101 analyzes the data collected by the drone 102, extracts and/or collects information relating to environmental conditions directly from the surface of the building exterior, the air space surrounding the building and/or the ground surface surrounding the building, and sends the extracted locations to the robot 103. The inspection operation controller 101 may also analyze the data collected by the drone 102, to extract locations where damage is suspected on the exterior of the building, and send the extracted locations to the robot 103. Upon receipt of the extracted locations, the robot 103 may more inspects, e.g., by physical contact, the exterior of a building at each of the extracted locations to determine whether the damage is real and/or to obtain objective data describing the condition of an exterior surface of the building such as heat profile (e.g., infrared heat profile), reflectance, roughness, texture, hardness, chemical composition, etc.

In a case where the indoor of a building is inspected, only the robot 103 is used to inspect rooms of a building. At each room, the robot 103 sets the height of sensors in response to the function of the room before starting measurement of predetermined parameters with the sensors.

In another embodiment of the invention both the interior environment and the exterior environment of a building are concurrently inspected and/or analyzed. Conditions such as a light level within a room may be correlated directly with sun exposure and sun intensity in the vicinity of the building. The conditions may be monitored dynamically such that changes in interior and/or exterior conditions are measured and recorded semi-continuously. Continuous co-monitoring and extraction of information from interior and exterior environments provides a means by which the conditions of the environments may be correlated with one another. Sunlight level may be linearly and/or sinusoidally related between interior and exterior environments. Under certain circumstances where thermal reflection, thermal mass, solar interference and/or other continuous or variable disturbances occur, a picture of the effects of the environment can be obtained as a function of time, position of the robot and/or drone or other criteria.

In another aspect of the invention the interior robot may be programmed with instructions to proceed on a known and programmed path through the interior of a building while remaining in communication with an exterior drone. Repetitive cycles of robot movement and drone position may be used to obtain a dynamic picture of the effects of exterior environmental conditions on the interior environment.

Of course, as will be appreciated by consideration of the entire disclosure, close inspection, both physical and sensory, or repeated analysis, may be triggered by data that indicates not only damage, but any unevenness or aberration in properties such as thermal reflectance, texture, solar exposure, airflow, and the like. For example, an abnormal infrared reading (e.g., an anomaly) may be indicative of a "hotspot" and may be the basis for triggering a physical or surface-contact inspection by the robot or a secondary drone configured to directly contact the exterior surface of the building.

Figure 2:
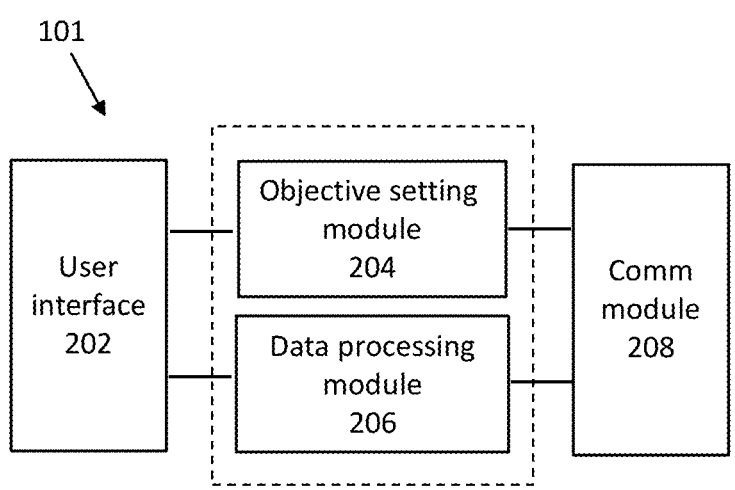
FIG. 2 is a block diagram of an inspection operation controller according to one embodiment.

In the context of the present disclosure, the term "damage" may include any aberration, anomaly, or abnormal departure from normal values obtained on the surface of the exterior of the building or in the environment in the vicinity of the building. Preferably the apparatus and process of the invention identify one or more environmental nonconformities or anomalies that correlate with one or more nonconformities or disjunctive values measured at an interior environment location corresponding to or related to the position of the exterior abnormality. FIG. 2 is a block diagram of the inspection operation controller 101 according to one embodiment. The inspection operation controller 101 includes a user interface 202, an objective setting module 204, a data processing module 206, and a communication module 208. The communication module 208 enables the inspection operation controller 101 to communicate with the drone 102, the robot 103, the database 104, and any other external device such as the user terminal 106 via the network 105. The user interface 202 receives input from a user regarding an inspection to be performed and sends the received user input to the objective setting module 204. The user interface 202 also receives results of data processing from the data processing module 206 and presents the results to a user. The user input may alternatively be received from the user terminal 106 via the network 105.

The objective setting module 204 sets an inspection objective using the user input received by the user interface 202 or from the user terminal 106 via the network 105. The objective setting module 204 also communicates with the database 104 via the network 105 to obtain structure data of a building or rooms to be inspected. The obtained structure data is added to the inspection objective. The inspection objective is information that enables the drone 102 or the robot 103 to carry out its inspection autonomously. The inspection objective may include, but is not limited to, the type of inspection (exterior or indoor), the location of a building or the locations of rooms in a building to be inspected, and structure data of the building or the rooms to be inspected.

Alternatively, a plurality of buildings or a plurality of rooms in a plurality of buildings may be specified as the targets of inspection. Further, instead of the location of a building or the locations of rooms, the inspection objective may alternatively include identification of a building or rooms to be inspected. In this case, the database 104 stores therein a table that defines a relationship between the identification, the location, and the structure data of each building or room. The drone 102 and the robot 103 communicates with the database 104 via the network 105 after receiving the inspection objective from the inspection operation controller 101 and obtain the location and structure data of a building or a room that correspond to the identification.

The data processing module 206 receives inspection data collected by the drone 102 or the robot 103 via the network 105. In a case where the inspection data collected by the drone 102 is received, the data processing module 206 extracts locations where damages on the exterior of a building are suspected and sends the extracted locations to the robot 103 via the network 105. In a case where the inspection data collected by the robot 103 is received, the data processing module 206 performs a predetermined data analysis on the inspection data and presents a result of the predetermined data analysis to a user via the user interface 202. The result of the predetermined data analysis may alternatively be presented to a user by way of sending the result of the predetermined data analysis to the user terminal 106 via the network 105.

Figure 3:
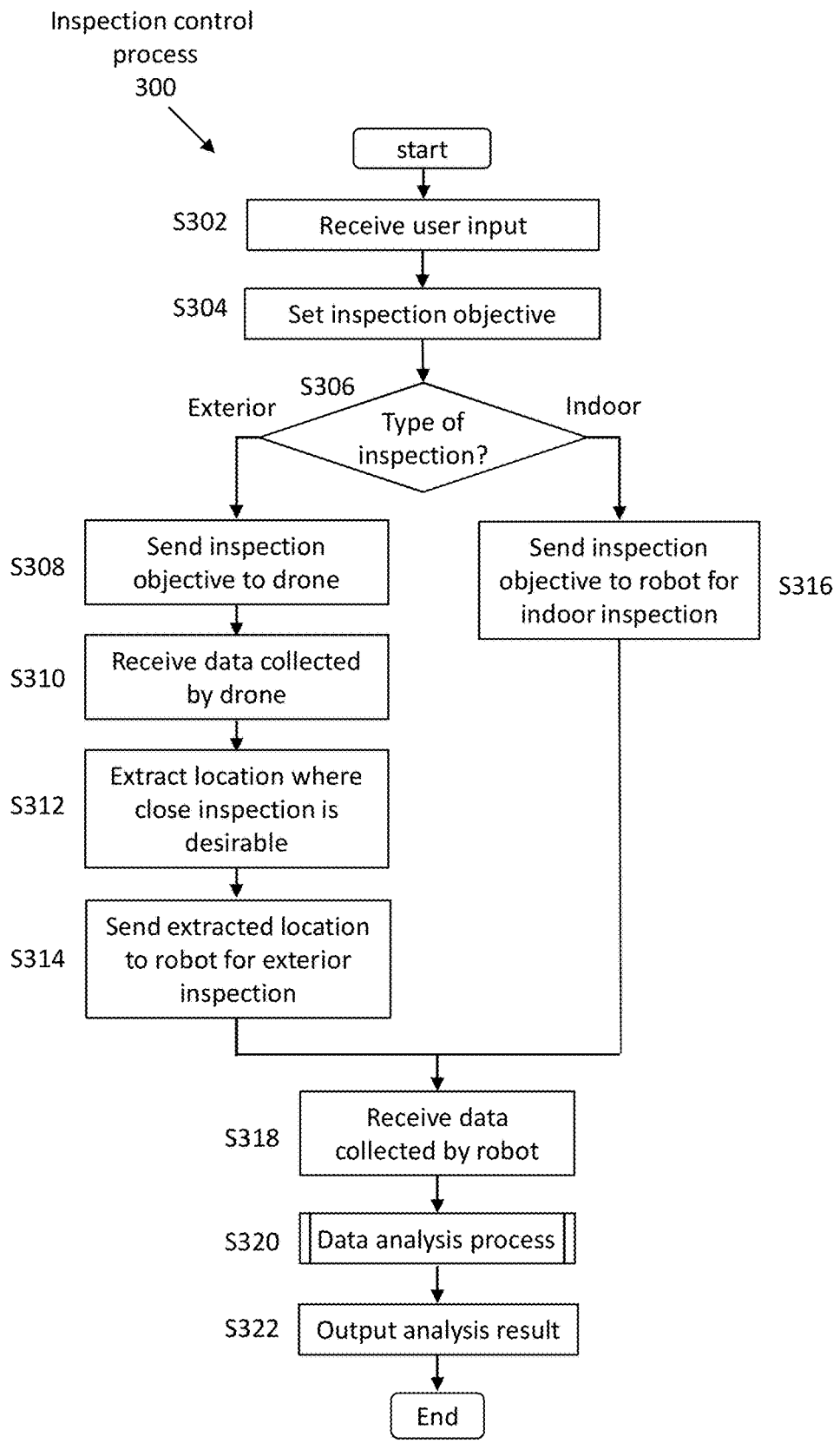
FIG. 3 is a flowchart of an inspection control process according to one embodiment.

FIG. 3 is a flowchart of an inspection control process 300 according to one embodiment. The inspection control process 300 is a process to be performed by the inspection operation controller 101 for controlling the operation of the building quality inspection system 1 illustrated in FIG. 1.

At step S302, user input regarding an inspection to be performed is received. The user input may be received directly with the user interface 202 or from the user terminal 106 via the network 105. At step S304, an inspection objective is set based on the user input. The inspection objective is information that enables the drone 102 or the robot 103 to carry out its autonomous inspection. Specifically, the inspection objective includes the type of inspection, the location of a building or rooms to be inspected, and structure data of the building or the rooms to be inspected. At step S306, it is determined whether the type of inspection is exterior or indoor. In other words, it is determined whether the inspection to be performed is an exterior inspection or an indoor inspection. If the inspection is an exterior inspection, the process 300 proceeds to step S308.

At step S308, the inspection objective is sent to the drone 102 via the network 105. This causes the drone 102 to start a visual inspection of the exterior of a building. The drone 102 returns inspection data collected during the visual inspection to the inspection operation controller 101. At step S310, the inspection data collected by the drone 102 are received by the inspection operation controller 101 via the network 105. The whole inspection data may be sent from the drone 102 to the inspection operation controller 101 upon completion of the visual inspection or part of the inspection data may be sent at predetermined intervals while carrying out the visual inspection.

At step S312, the received inspection data is sent to the data processing module 206 for data analysis. The data processing module 206 analyzes the received inspection data and extracts the locations where damages on the exterior of the building are suspected. At step S314, the extracted locations are sent to the robot 103 for exterior inspection. In the present embodiment, the robot 103 having a configuration suited for exterior inspection (hereinafter, may be also referred to as robot for exterior inspection) is used for inspecting the exterior of a building whereas the robot 103 having a configuration suited for indoor inspection (hereinafter, may be also referred to as robot for indoor inspection) is used for inspecting the indoor of a building. That is, depending on whether the inspection is exterior or indoor, the robot 103 changes its configuration to facilitate positioning of the sensors. Details regarding the configuration of the robot 103 are discussed further herein. Upon receipt of the extracted locations, the robot 103 for exterior inspection carries out an exterior inspection at the locations where damages on the exterior of a building are suspected for close inspection and returns inspection data collected during the exterior inspection to the inspection operation controller 101.

Returning to step S306, if the inspection is determined as an indoor inspection, the process 300 proceeds to step S316. At step S316, an inspection objective is sent to the robot 103 for indoor inspection via the network 105. This causes the robot 103 for indoor inspection to start an indoor inspection of a building. Upon receipt of the inspection objective, the robot 103 moves to each of the rooms to be inspected in a building, sets the height of the sensors according to the function of the room, measures predetermined parameters such as, for example, parameters relating to human comfort in the room with the sensors, and returns inspection data collected during the inspection to the inspection operation controller 101 via the network 105.

At step S318, the data collected by the robot 103 for exterior inspection or the data collected by the robot 103 for indoor inspection are received via the network 105 and sent to the data processing module 206 of the inspection operation controller 101. At step 320, a data analysis process is performed to determine the current quality of the exterior or indoor of a building. A specific example of the data analysis process is provided with reference to FIG. 17. At step 322, a result of the data analysis process is output to a user via the user interface 202 or sent to the user terminal 106 via the communication module 208 and the network 105.

Figure 4:
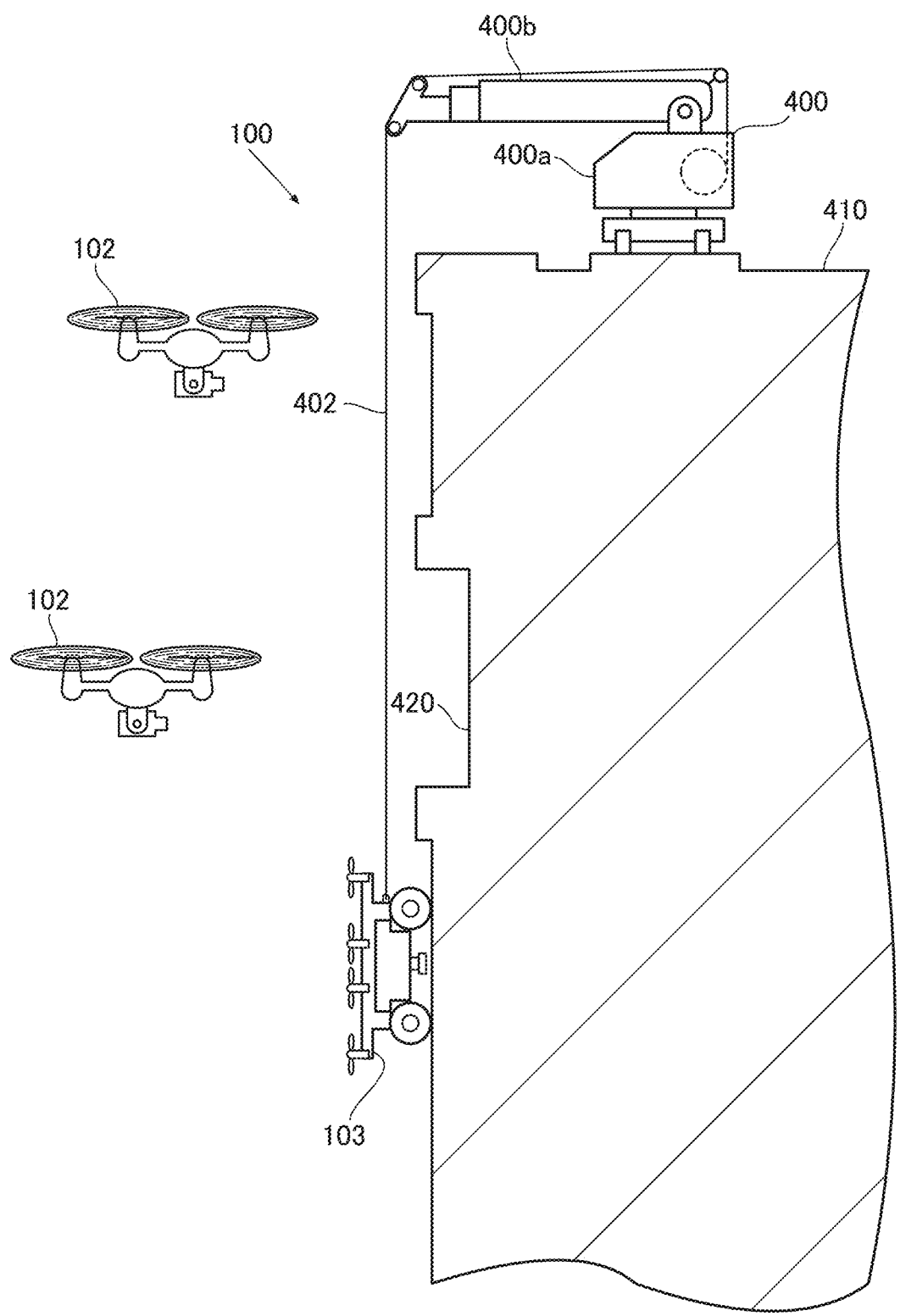
FIG. 4 is a schematic diagram of a building quality inspection system for exterior inspection according to one embodiment.

Next, the setup and operation of a building quality inspection system 100 for exterior inspection according to one embodiment is described. FIG. 4 is a schematic diagram of the building quality inspection system 100 for exterior inspection according to the present embodiment. In the present embodiment, two drones 102 and one robot 103 are employed to inspect the exterior of a building 410. FIG. 4 depicts the drones 102 flying around a building 410 while taking pictures of the exterior of the building 410 and the robot 103 being suspended from above at a predetermined location of the exterior of the building 410 so as to carry out an inspection at that location. The drones 102 and the robot 103 are communicably connected with, via a network 105, the inspection operation controller 101 and the database 104 of the building quality inspection system 100, which are not shown in FIG. 4.

Figure 5:
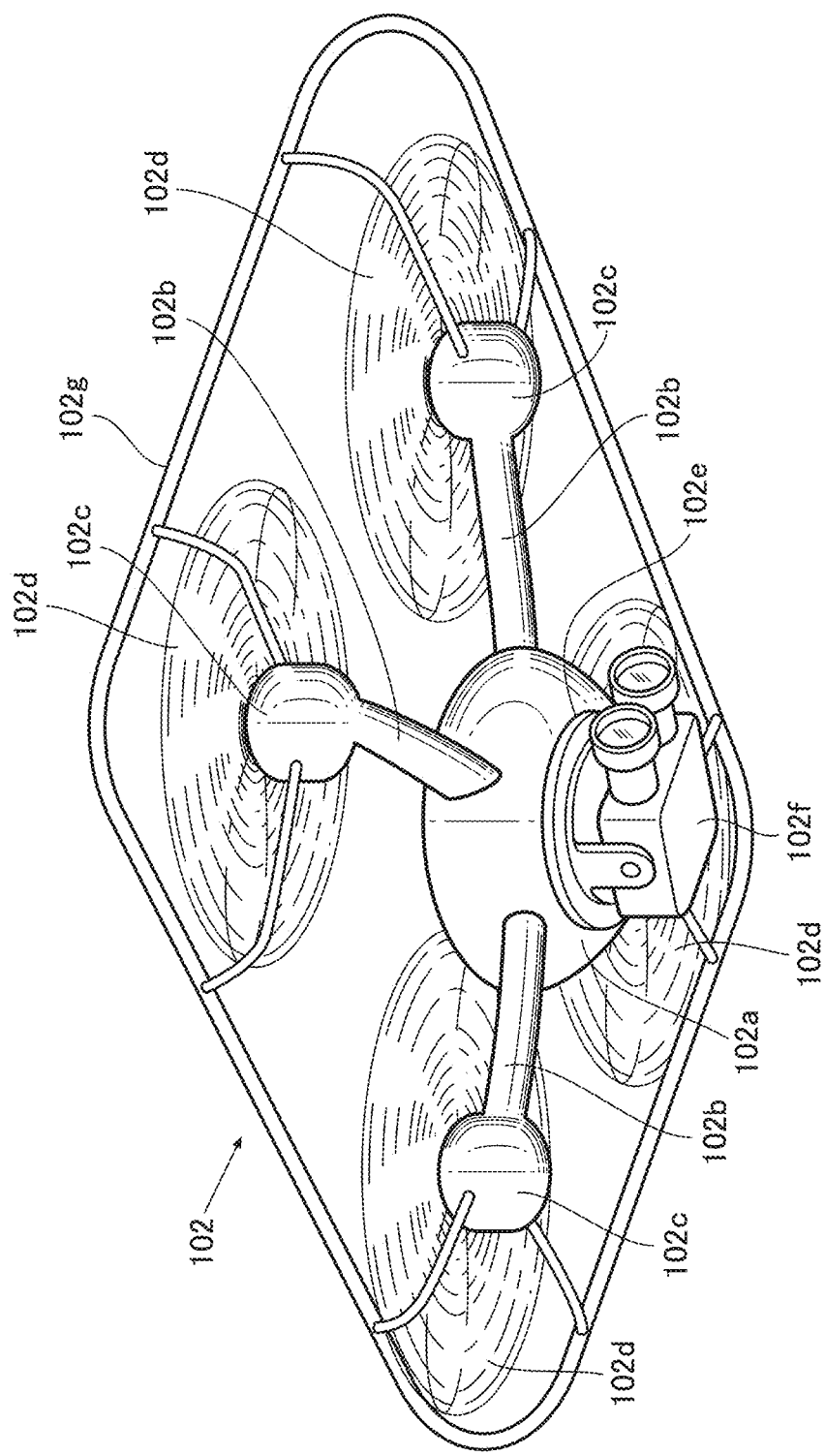
FIG. 5 is a perspective view of a drone for exterior inspection according to one embodiment.

FIG. 5 is a perspective view of the drone 102 for exterior inspection according to one embodiment. The drone 102 includes a drone body 102a, four propeller support arms 102b extending in four directions from the drone body 102a, four motors 102c attached to top end portions of the propeller support arms 102b, and four propellers 102d mounted on the four motors 102c. The drone 102 further includes a drone camera 102f mounted on a pan-and-tilt mechanism 102e attached on a bottom of the drone body 102a and a propeller guard rail 102g connected to the top end portions of the propeller support arms 102b in such a way as to position outside the propellers 102d.

In the present embodiment, the drone camera 102f uses a stereoscopic camera in which two cameras are laid side by side with a predetermined distance as illustrated in FIG. 5. As illustrated in FIG. 4, during the exterior inspection, a plurality of the drones 102 take pictures of the exterior of the building 410 having a window 420 while flying around the building 410 or staying still in air and while changing a direction of the drone camera 102f using the pan-and-tilt mechanism 102e. Here, the plurality of the drones 102 is used to increase efficiency in taking pictures of the whole building 410. Alternatively, only one drone 102 may be used. Stereoscopic pictures of the exterior of the building 410 taken by the drones 102 are sent to the inspection operation controller 101 via the network 105.

The inspection operation controller 101 receives data collected by each of the drones 102 via the network 106. In this case, the data collected by the drones 102 are stereoscopic pictures of the exterior of the building 410. The inspection operation controller 101 accumulates these data until the inspections of the drones 102 end and prepares, for example, 3D information of the exterior of the building 410. Alternately, the drones may be used to collect information relating to the exterior environment such as any of the environmental conditions described herein. Specifically, the 3D information of the exterior of the building 410 includes the two-dimensional configuration of protruded portions and depressed portions formed across the entire exterior of the building 410 such as windows as well as depth information of the respective portions. If it is determined that accumulated 3D information is not sufficient at some locations to carry out a subsequent inspection to be performed by the robot 103, the inspection operation controller 101 sends an additional instruction to the drone 102 to instruct the drone 102 to take pictures of the locations where the accumulated 3D information of the exterior of the building 410 is determined as insufficient.

After the 3D information of the entire exterior of the building 410 is completed, the inspection operation controller 101 extracts one or more locations where damage is suspected from the 3D information of the entire exterior of the building 410. Here, the damages may include, but are not limited to, cracks, unevenness, abnormal projections, abnormal depressions, discolorations, breakages, loss of exterior material, and the like. The extracted locations where the damage is suspected are marked as locations where close inspection is desirable and linked with the 3D information of the entire exterior of the building 410. (3*)

Further, the inspection operation controller 101 extracts one or more locations of damage-prone parts of the exterior of the building 410, which are known to be prone to damage, from past inspections stored in the database 104. The damage-prone parts of the exterior of a building may include, but are not limited to, edges or corners of structures such as windows, overhangs, balconies formed on the exterior of a building, or any other characteristic features known to be prone to damage. The extraction of the locations of the damage-prone parts may be performed before the start of or during the exterior inspection of the drones 102. The extracted locations of the damage-prone parts are also marked as locations where close inspection is desirable and linked with the 3D information of the entire exterior of the building 410.

With the 3D information including the stereoscopic pictures taken by the drones 102, the extracted locations where the damage is suspected and the extracted location of damage-prone parts, the inspection operation controller 101 generates mapping information of the exterior of the building 410 in which partial areas are weighted according to the plausibility of damages. For example, a partial area is weighted as the highest level of the plausibility of damage if the area includes both the extracted location where damage is suspected and the extracted location of damage-prone part, and a partial area is weighted as the lowest level of the plausibility of damage if the area dose not correspond to any of the extracted locations. This mapping information is used to determine locations for close inspection. (4*)

Next, the inspection operation controller 101 determines locations to be inspected by the robot 103 for close inspection from the mapping information of the exterior of the building 410 in which areas are weighted according to the plausibility of damages and/or environmental anomaly. For example, in a case where the inspection is needed to finish in short time and only locations of high risk are inspected, the inspection operation controller 101 extracts locations where the plausibility of damage is the highest and determines them as locations where close inspection is desirable. In a case where the inspection is not needed to finish in short time, the inspection operation controller 101 extracts locations where the plausibility of damage is intermediate to highest and determines them as locations where close inspection is desirable. Alternatively, the robot 103 may inspects the entire exterior of the building 410. In that case, the robot 103 will be instructed to carry out a more detailed inspection at the locations having higher plausibility weights compared with the locations having lower plausibility weights. The drone camera 102 may be configured to take pictures with different wavelengths. For example, the drone camera 102 may be configured to take pictures with visible light and near-infrared light. The near-infrared light is used because the near-infrared light enables to see through obstacles such as smoke. In this case, an additional near-infrared light camera may be installed in the drone 102. Alternatively, the drone camera 102f may be configured to have an image sensor sensitive to both visible light and near-infrared light and a mechanism that moves an infrared-cut filter in and out from an optical path of the drone camera 102f, thereby enabling the drone camera 102f to take visible light pictures and near-infrared light pictures in a switchable manner.

The drone 102 may further include a lighting source for illuminating areas of the building 410 where taking pictures is difficult such as shadowed areas to facilitate the picture-taking of the drone camera 102f This enables to take more clear pictures of the exterior of the building 410. In the case where the near-infrared light pictures are to be taken, a near-infrared lighting source may be installed in the drone 102.

In the present embodiment, a stereoscopic camera including two image sensors is used for the drone camera 102f to take stereoscopic pictures of the exterior of the building 410. Alternatively, in a case where the drone 102 can take pictures while moving around the building 410 at a constant speed, a camera with a single image sensor may be used for the drone camera 102f. In this case, the inspection operation controller 101 produces stereoscopic pictures from pictures of the same area taken from different view angles. In general, flying the drone 102 involves various restrictions, and thus it is preferable to use a stereoscopic camera for the drone camera 102f.

Figure 6:
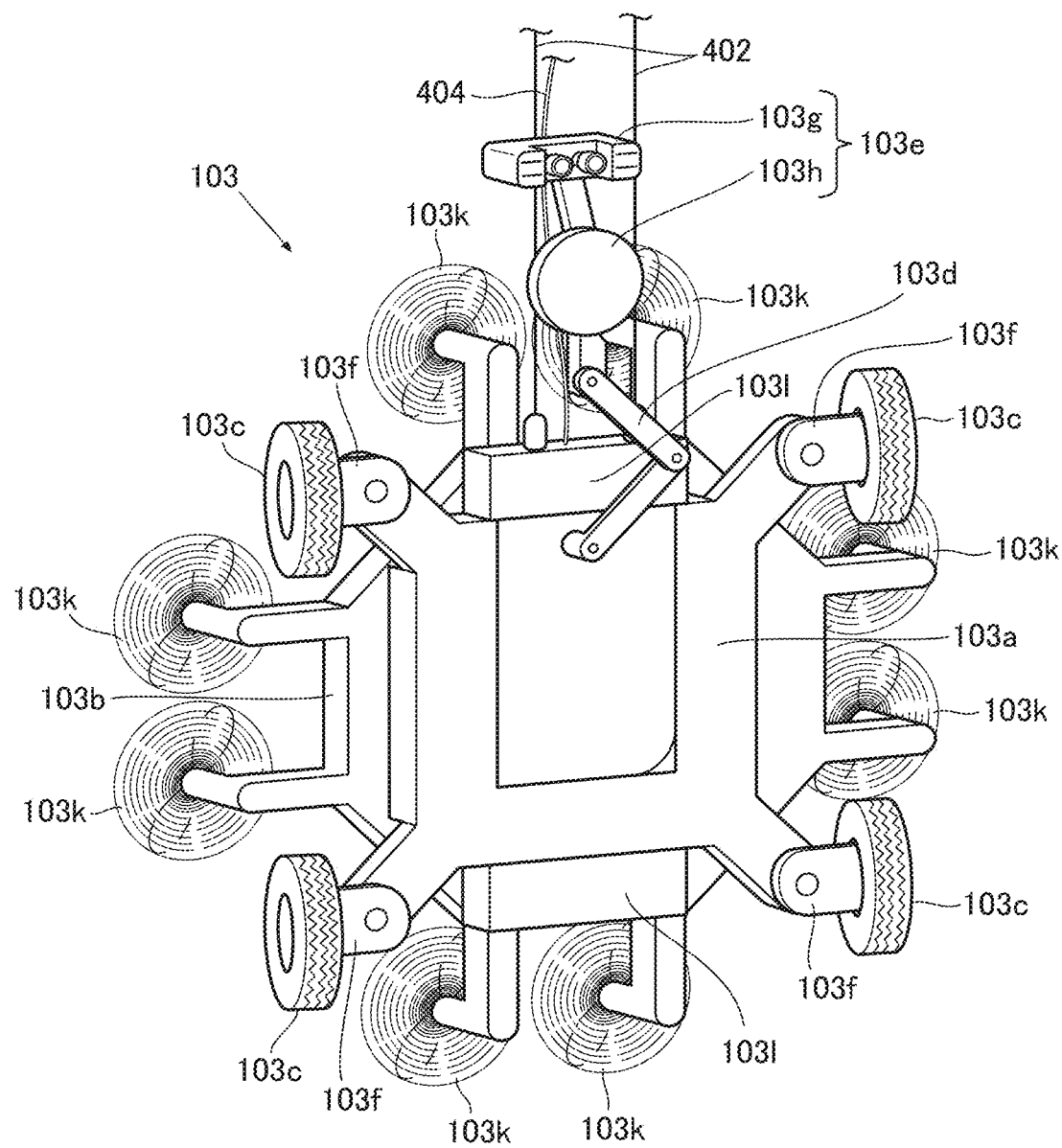
FIG. 6 is a perspective view of a robot for exterior inspection according to one embodiment.

Next, the robot 103 for exterior inspection is described in detail. As illustrated in FIG. 4, the robot 103 for exterior inspection is connected to a crane 400 with wire ropes 402 and suspended along the exterior of the building 410. FIG. 6 is a perspective view of the robot 103 for exterior inspection according to one embodiment, viewed from the exterior of the building 410. The robot 103 for exterior inspection receives electric power supplied from the crane 400 using electric cables 404. Further, the robot 103 sends a signal to the crane 400 via the electric cables 404 to instruct the crane 400 where the robot 103 is to be suspended. Upon receipt of such signal, the crane 400 operates in such a way as to move the robot 103 to a designated location.

In the present embodiment, the robot 103 autonomously carries out an inspection based on the inspection objective assigned and received from the inspection operation controller 101. Alternatively, during the inspection, the robot 103 may be in communication with the inspection operation controller 101 via the network 105 and inform the inspection operation controller 101 of current locations of the robot 103 and the crane 400 and their operation status in such a way that the inspection operation controller 101 can control movements of the robot 102 and/or the crane 400 if needed. The crane 400 has a configuration similar to a typical crane being used in maintenance of buildings. The crane 400 includes a wheeled platform 400a and a crane arm 400b as illustrated in FIG. 4. The wheeled platform 400a is self-propelled and can moves along a predetermined track laid on a roof of the building 410 and supports the crane arm 400b in a swingable manner. The crane arm 400b has a telescopic structure, and the wire ropes 402 are hung down from the end of the crane arm 400b to suspend the robot 103 at a designated location of the exterior of the building 410 with a predetermined gap therebetween.

Figure 7A:
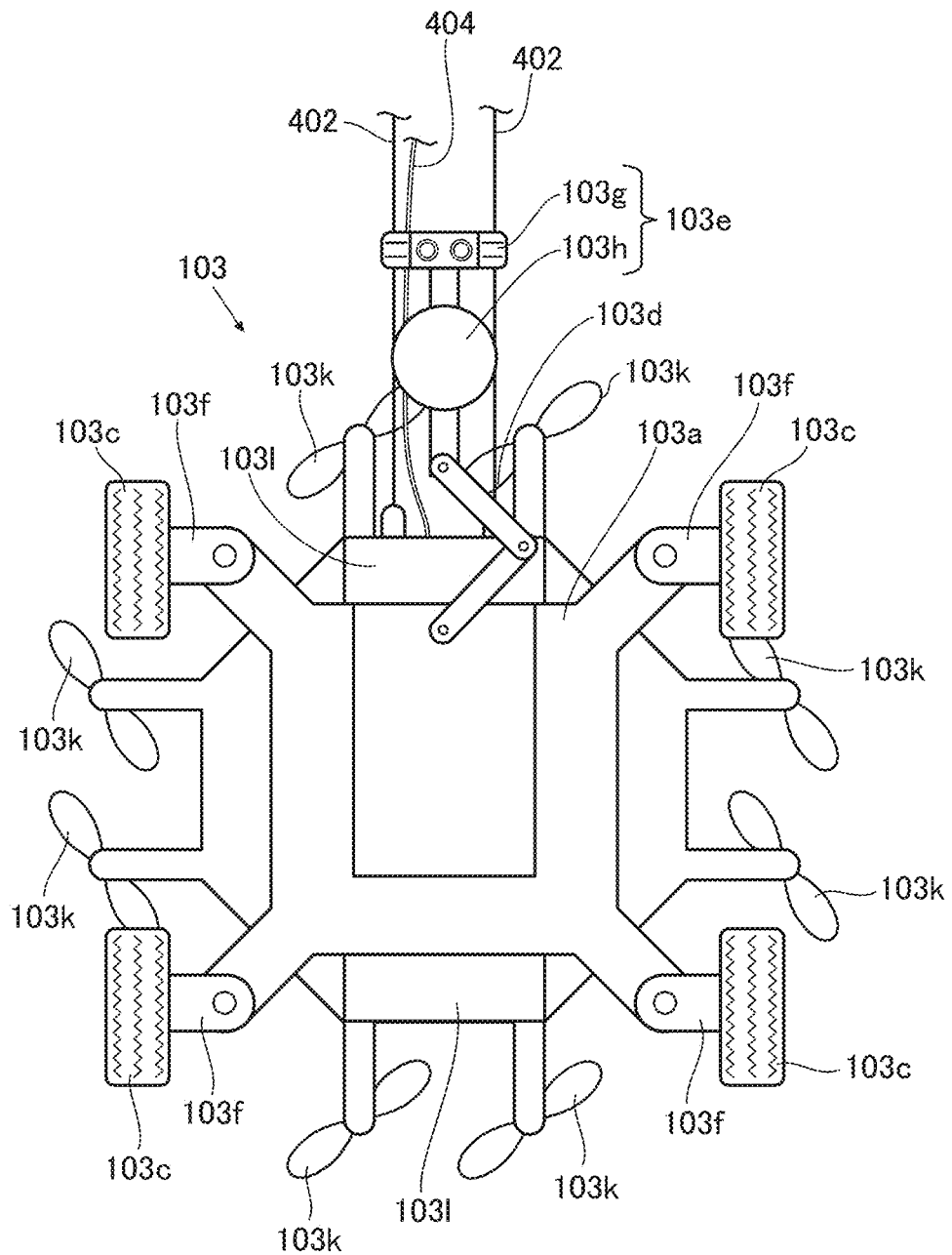
FIG. 7A is a front view of the robot illustrated in FIG. 6.
Figure 7B:
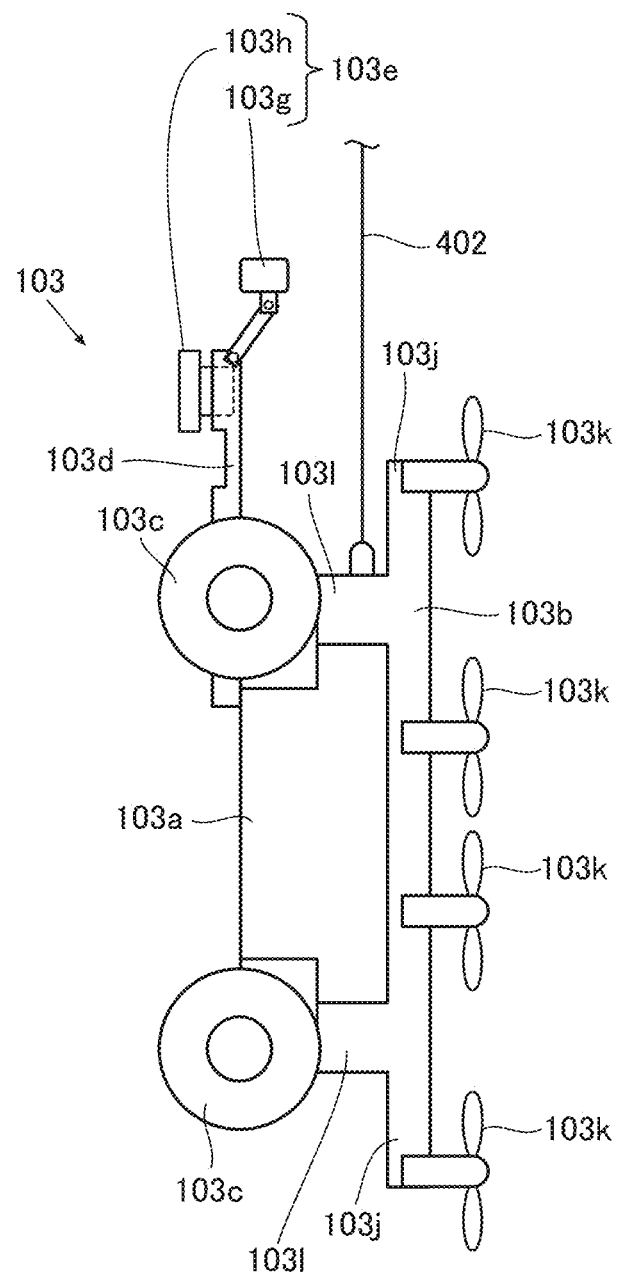
FIG. 7B is a side view of the robot illustrated in FIG. 6.
Figure 7C:
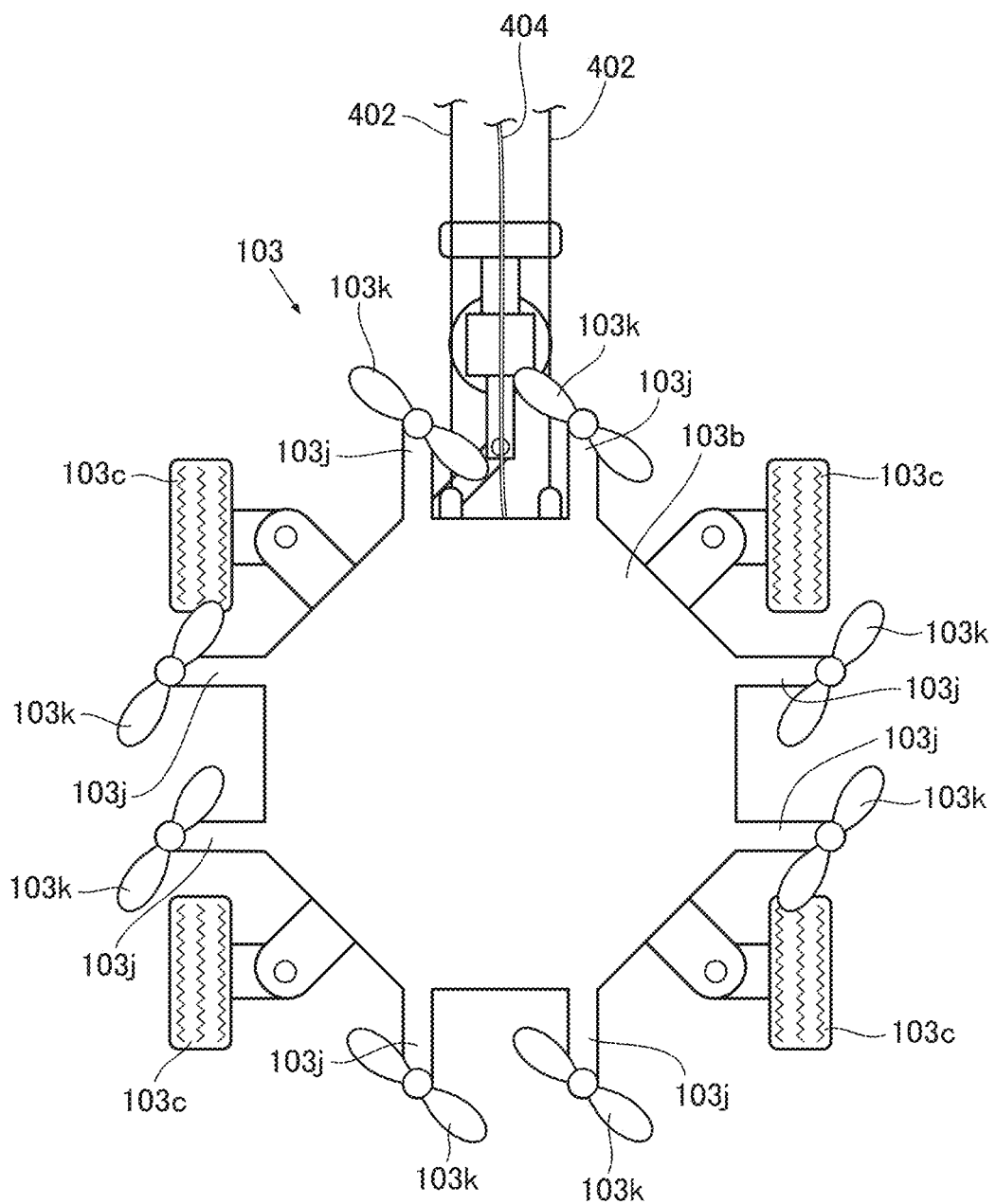
FIG. 7C is a rear view of the robot illustrated in FIG. 6.

FIG. 7A is a front view of the robot 103 for exterior inspection illustrated in FIG. 6, viewed from the side of the exterior. FIG. 7B is a side view of the robot 103 for exterior inspection illustrated in FIG. 6. FIG. 7C is a rear view of the robot 103 for exterior inspection illustrated in FIG. 6, viewed from the other side of the exterior of the building 410. As illustrated in FIG. 6 and FIGS. 7A to 7C, the robot 103 for exterior inspection has approximately a flat shape as a whole and includes a robot body 103a and a hanging unit 103b. The robot body 103a has a foldable portion that is folded to a horizontal position for exterior inspection. The hanging unit 103b is attached to the robot body 103a in a detachable manner. The hanging unit 103b enables to suspend the robot body 103a along the exterior of the building 410. Details regarding the foldable portion of the robot body 103a and the detachment of the hanging unit 103b are discussed further herein with reference to FIG. 13A and FIG. 13B.

The robot body 103a is a part of the robot 103 that faces the exterior of a building to inspect, has approximately a flat square shape, and includes four wheels 103c, and an inspection sensor unit 103e being held by a holding arm 103d. Four corners of the robot body 103a are each provided with a protruding portion where a wheel drive 103f and the wheel 103c are mounted. The wheel drive 103f is pivotally mounted on the robot body 103a so as to be able to change the direction of the wheel 103c. The wheel 103c is driven by the wheel drive 103f The wheels 103c has an outer surface made of a soft material like a rubber tire and the like for protection of the exterior of the building 410.

The holding arm 103d is pivotally mounted on an upper part of the robot body 103a on the side facing the exterior of the building 410. The holding arm 103d is a robot arm with rotary joints. By rotating the respective rotary joints, the holding arm 103d moves the inspection sensor unit 103e at a location where an inspection is to be performed. In the present embodiment, the joints are depicted in the drawings as a rotary joint that has a single axis and rotates in a two-dimensional plane. Alternatively, the joint may have a plurality of axes to be rotatable in a three-dimensional manner. The inspection sensor unit 103e includes a camera unit 103g and a wall inspection unit 103h. The wall inspection unit 103h includes at least one of an ultrasonic inspection device that inspects conditions of the exterior of the building 410 by means of ultrasonic waves and a hammer testing device that inspects conditions of the exterior of the building 410 by analyzing sound produced when the exterior of the building 410 is hit by a hammer. The wall inspection unit 103h also includes a plurality of sensors used to measure environmental conditions exterior to the building. The ultrasonic inspection device and the hammer testing device allow it to inspect conditions inside the exterior of the building 410. The wall inspection unit 103h is attached to the holding arm 103d in such a way as to move in a front-back direction with respect to the robot body 103a. When carrying out an inspection, the wall inspection unit 103h is brought into contact with the exterior of the building 410.

The camera unit 103g is a camera device for taking pictures of the exterior of the building 410 from close distance and includes a stereoscopic camera and a lighting source. The camera unit 103g is connected to the wall inspection unit 103h by a camera arm 103i. The camera arm 103i is configured to move the camera unit 103g and change the direction of the camera unit 103g along an up-down direction and a right-left direction with respect to the robot body 103a. The hanging unit 103b forms a rear-side part of the robot 103. As illustrated in FIG. 7C, the hanging unit 103b is flat and has approximately an octagonal shape. From each of vertically top, down, right, and left sides of the hanging unit 103b, a pair of blower arms 103j is protruded, and at an end portion of each blower arm 103j, a blower 103k is mounted for blowing out air.

As illustrated in FIG. 7B, a protruded fitting portion 1031 is formed at each of an upper part and a lower part of the hanging unit 103b. The hanging unit 103b is configured in such a way that the hanging unit 103b and the robot body 103a are joined together by fitting the protruded fitting portions 1031 into the robot body 103a. The wire ropes 402 are connected to a vertically top surface of the upper protruded fitting portion 1031 to enable suspension of the robot 103 from the crane 400. Further, at the vertically top surface of the upper protruded fitting portion 1031, the electric cables 404 are connected. This enables to supply power from the crane 400 to the robot 103 and enables communication between the robot 103 and the crane 400. For example, the robot 103 sends to the crane 400 signals such as an instruction as to where the robot 103 is to be suspended.

Figure 8:
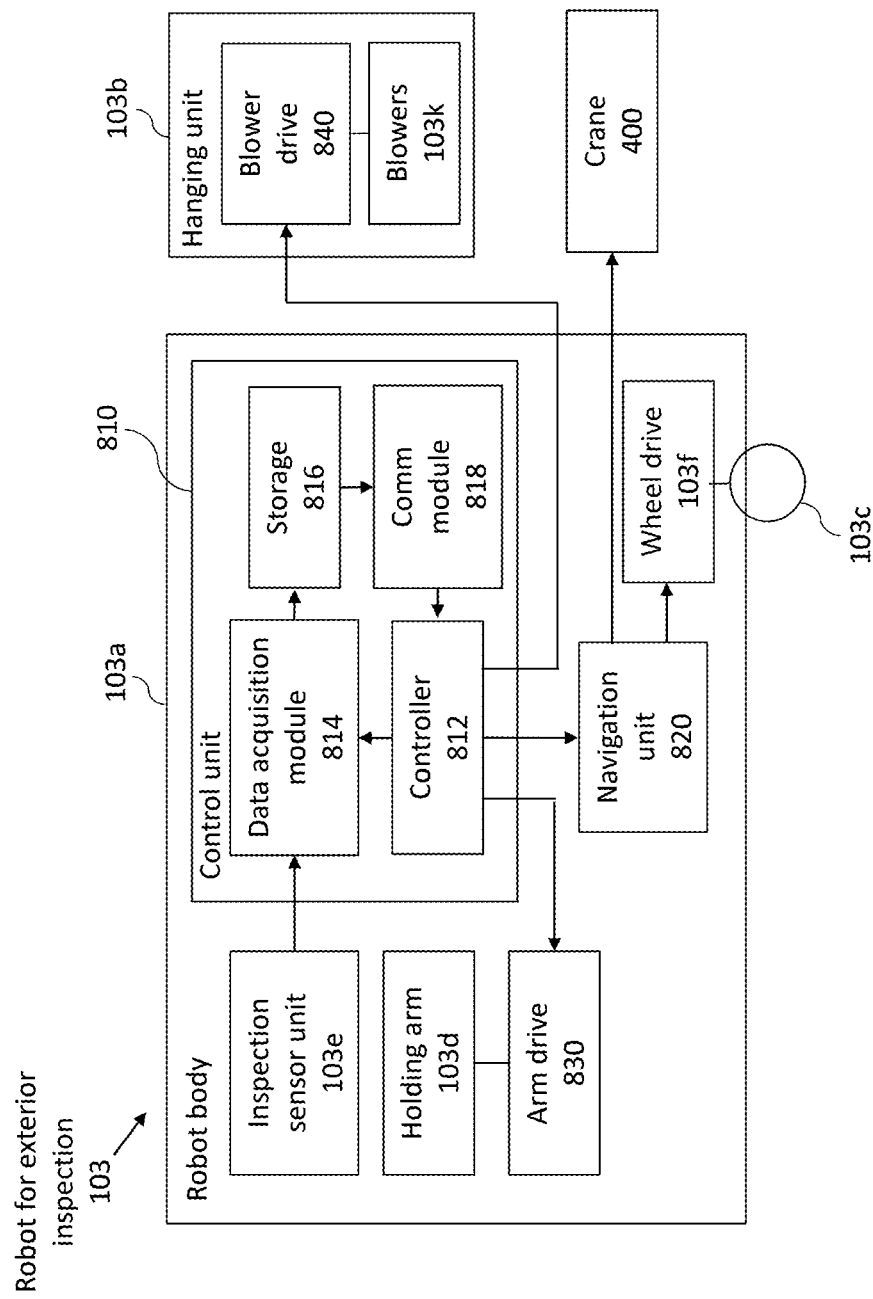
FIG. 8 is a schematic block diagram of the robot for exterior inspection according to one embodiment.

FIG. 8 is a schematic block diagram of the robot 103 for exterior inspection according to one embodiment. The robot 103 for exterior inspection includes, in addition to the foregoing configuration, a control unit 810, a navigation unit 820, and an arm drive 830 in the robot body 103a, and a blower drive 840 in the hanging unit 103b. The control unit 810 includes a controller 812, a data acquisition module 814, a storage 816, and a communication module 818.

The controller 812 controls the operation of the robot 103 and is, for example, a computer including a processor and a memory storing instructions to be executed by the processor to implement a robot exterior inspection process, which will be described later with reference to FIG. 12. The controller 812 receives one or more extracted locations where close inspection is desirable (hereinafter, may also referred to as target locations) from the inspection operation controller 101 via the network 105 and the communication module 818. Upon receipt of the target locations, the controller 812 controls operations of the data acquisition module 814, the navigation unit 820, the arm drive 830, and the blower drive 840 to carry out close inspection of the exterior of the building 410 at the target location.

The data acquisition module 814 reads measurement values of one or more sensors included in the inspection sensor unit 103e and designated by the controller 812 at timing designated by the controller 812. Further, the data acquisition module 814 stores data of the measurement values into the storage 816. The data stored in the storage 816 is sent to the inspection operation controller 101 via the communication module 818 and the network 105.

The navigation unit 820 includes sensors such as, for example, a GPS sensor and an acceleration sensor for detecting a current location of the robot 103 and controlling the wheel drive 103f and the crane 400 so as to move the robot 103 to a location designated by the controller 812. The navigation unit 820 may alternatively employ simultaneous localization and mapping (SLAM) and include sensors for SLAM.

The arm drive 830 supplies drive power to the holding arm 103d to adjust the position of the inspection sensor unit 103e in such a way that the inspection sensor unit 103e is brought over the target position after the robot 103 arrives at the location designated by the controller 812. The blower drive 840 supplies drive power to the blowers 103k and controls operations of individual blowers 103k.

Figure 9B:
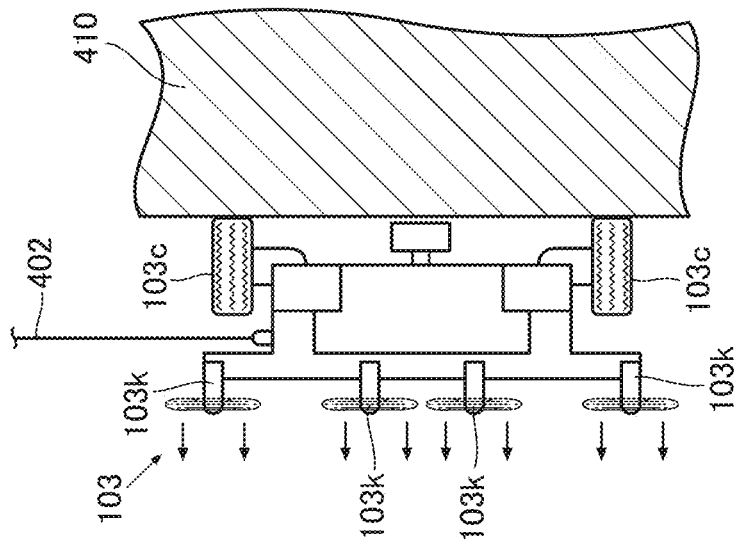
FIG. 9B is a side view of the robot for exterior inspection in motion in a traverse direction.
Figure 9A:
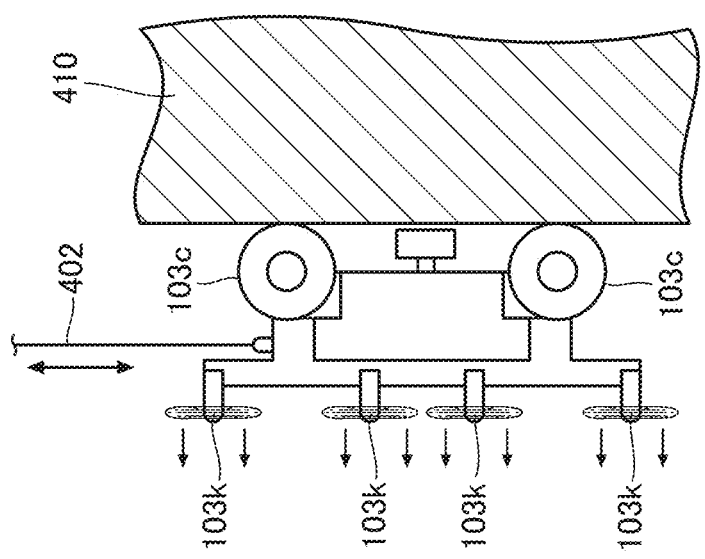
FIG. 9A is a side view of the robot for exterior inspection in motion in a vertical direction.

Next, the operation of the robot 103 for exterior inspection is described in detail with reference to FIGS. 9A-9B and 10A-10B. FIG. 9A is a side view of the robot 103 for exterior inspection in motion in a vertical (up-down) direction. FIG. 9B is a side view of the robot 103 for exterior inspection in motion in a traverse (right-left) direction.

First, it is described how the robot 103 for exterior inspection described above moves to a target location where the robot 103 needs to carry out an inspection. As illustrated in FIGS. 9A and 9B, upon receipt of an instruction from the robot 103, the crane 400 brings the robot 103 close to the exterior of the building 410 at approximately a preset location. Subsequently, the blowers 103k are turned on to make winds so as to press the robot 103 against the exterior of the building 410, thereby bringing the wheels 103c in close contact with the surface of the exterior of the building 410. When the robot 103 moves vertically, the robot 103 sets the direction of the wheels 103c in the up-down direction as illustrated in FIG. 9A. Further, the robot 103 sends an instruction to the crane 400 to pull up or down the wire ropes 402 and starts rotating the wheels 103c at the same time with the blowers 103k being turned on. This enables the robot 103 to move to a preset location in the up-down direction while being pressed against the exterior of the building 410.

Similarly, when the robot 103 is moved in the right-left direction, the robot 103 sets the direction of the wheels 103c in the right-left direction as illustrated in FIG. 9B. Further, the robot 103 sends an instruction to the crane 400 in such a way that the crane 400 moves to a preset location in order to move the wire ropes 402 in the right-left direction and starts rotating the wheels 103c at the same time with the blowers 103k being turned on. This enables the robot 103 to move to a preset location in the right-left direction while being pressed against the exterior of the building 410. A similar operation may be employed when the robot 103 moves in a diagonal direction. The robot 103 can determines its own location using the navigation unit 820. Alternatively, the location of the robot 103 may be determined more precisely with respect to the building 410 by sending the drone 102 to the vicinity of the robot 103 in operation as illustrated in FIG. 4, taking pictures of the robot 103 from the drone camera 102f, and determining the location of the robot 103 on the exterior of the building 410 based on the pictures. As illustrated in FIG. 5, the drone 102 includes the propeller guard rail 102g. The propeller guard rail 102g protects the drone 102 from falling due to a damage on the propeller 102d in case the drone 102 accidentally hits the wire ropes 402 or the exterior of the building 410 due to a sudden gust of wind or the like when the drone 102 is flying in the vicinity of the robot 103.

Next, a dust removing mechanism that removes sand and dust from the exterior of the building 410 and facilitates the close inspection of the robot 103 is described. Specifically, the dust removing mechanism enables to take clearer pictures in a case where the camera unit 103g of the robot 103 is used for taking pictures of the exterior of the building 410 from close distance. FIG. 10A is a side view of the robot 103 for exterior inspection during a dust removing operation. FIG. 10B is a side view of the robot 103 for exterior inspection during the dust removing operation.

For example, in a case where a building 410 is located in a city close to a desert area, sand and dust caused by sand storms from nearby deserts often affect the conditions of the exterior of the building 410. Typically, sand and dust (hereinafter, collectively referred to as sand particles) brought by a sand storm are powdery and consisting of fine particles. When such sand particles 1010 are blown to the exterior of the building 410, a crack 412 formed on the surface of the exterior of the building 410 may be filled and covered with the sand particles 1010. This makes it difficult to detect the presence of the crack 412 and to observe conditions of the crack 412 even if there is one. In order to address this issue, the robot 103 in the present embodiment employs the dust removing mechanism to remove sand particles 1010 attached to the crack 412 and/or the surface of the exterior of the building 410 before taking pictures from close distance. The robot 103 includes, in the hanging unit 103b, a plurality of the blowers 103k for pressing the robot 103 against the exterior of the building 410. In the present embodiment, as illustrated in FIG. 10A, one or more blowers 103k of the plurality of the blowers 103k are controlled so as to reverse their rotations and blow out air 1000 toward the exterior of the building 410. That is, the sand particles 1010 attached to the exterior of the building 410 can be removed by blowing out air 1000 from the one or more of the blowers 103k while pressing the robot 103 against the exterior of the building 410 using the remaining of the plurality of the blowers 103k. Having removed the sand particle 1010 from the exterior of the building 410, as illustrated in FIG. 10B, the robot 103 can carry out an inspection, for example, by taking pictures from close distance with the camera unit 103g and/or carrying out an inspection with the wall inspection unit 103h. The foregoing dust removing operation for removing the sand particles 1010 by blowing air 1000 is effective not only sand and dust but also dirt or fine rocks that are larger in size. Further, the above example is described with the case where the crack 412 is formed on the exterior of the building 410. The foregoing operation may also be used for other characteristic structures where damage is suspected. The blower drive 840 of the hanging unit 103b controls the rotational speed and the direction of rotation of the individual blowers 103k. This enables to increase or decrease the strength of wind toward the exterior of the building 410 depending on conditions of the exterior of the building 410. For example, the number of the blowers 103k to blow out air away from the exterior of the building 410 may be increased to press the robot 103 against the exterior of the building 410 with stronger force.

In the foregoing dust removing operation, of the plurality of the blowers 103k, one or more of the blowers 103k is used to blow out air to the exterior of the building 410. Alternatively, an air blowing device for blowing out air to the exterior of the building 410 may be added. For example, a robot arm may be added to the robot 103, and the air blowing device may be attached to the top end of that robot arm. Such a robot arm with the air blowing device functions to widen an area within which the air blowing device can be positioned for blowing out air to the exterior of the building 410.

The foregoing example is described for the case of the building 410 with the window 420. Alternatively, the building 410 may be part or the whole of another structure such as a bridge, a tower, a moat, a castle, electrical utility, hydrocarbon production rig, factory, agricultural barrier, and the like. In a case where the crane 400 is not available in the building 410, a self-propelled mobile crane or a crane with a long boom typically being used in a construction site may be used. Further, instead of using the crane, a hoist that pulls the wire ropes 402 or the like may alternatively be used.

Figure 11:
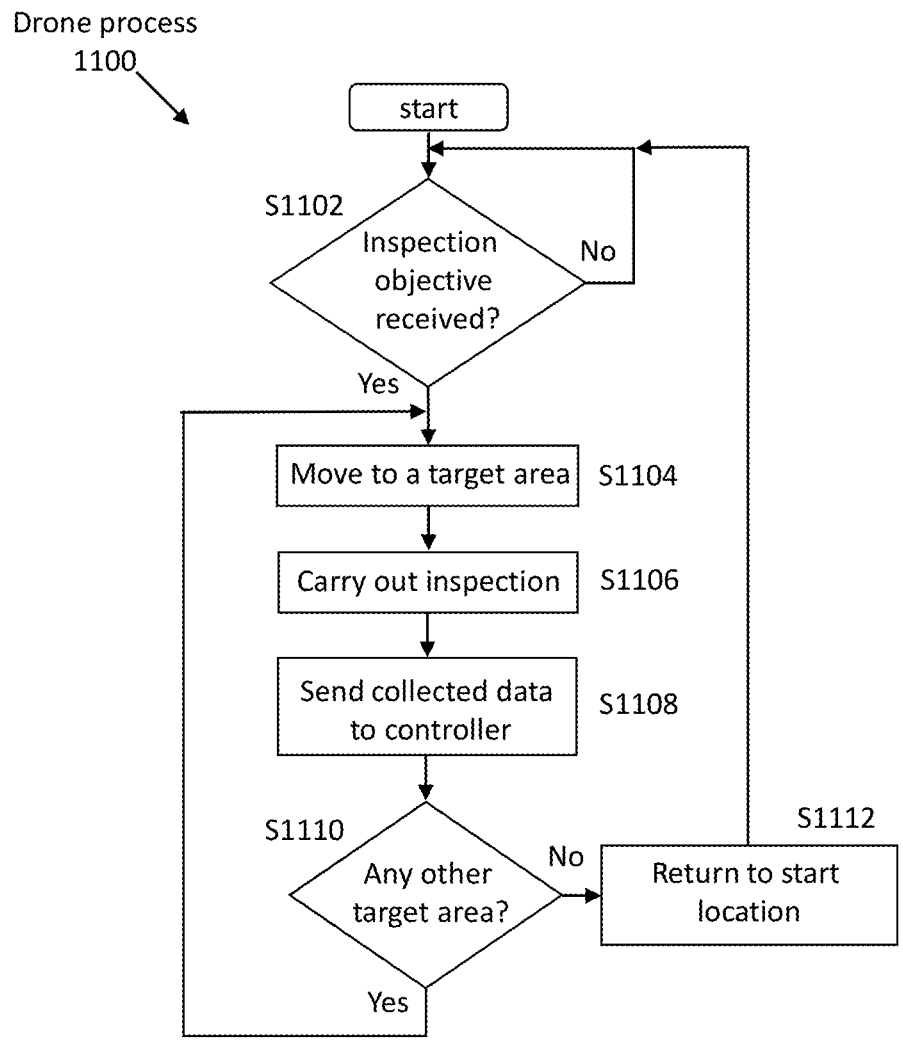
FIG. 11 is a flowchart of a drone process according to one embodiment.

The foregoing operations of the drone 102 and the robot 103 for exterior inspection may be summarized as follows. FIG. 11 is a flowchart of a drone process 1100 according to one embodiment. The drone process 1100 is a process to be performed by the drone 102 when the drone 102 inspects the exterior of the building 410. In other words, the drone process 1100 is performed by the drone 102 between step S308 and step S310 of the inspection control process 300 illustrated in FIG. 3.

First, in the drone process 1100, the drone 102 is kept on standby at a start location. When the drone 102 receives an inspection objective from the inspection operation controller 101 (Yes at step S1102), the process 1100 proceeds to step S1104. The inspection objective is sent from the inspection operation controller 101 to the drone 102 at step S308 of the inspection control process 300 illustrated in FIG. 3.

Having received the inspection objective, the drone 102 flies to a target area to be inspected on the exterior of a building (step S1104) and starts a visual inspection of the target area of the exterior of a building (step S1106). The visual inspection may be performed, for example, using a stereoscopic camera to obtain 3D information of the exterior of a building, which includes depth information on the exterior of a building. When the inspection is completed, data collected during the inspection is sent from the drone 102 to the inspection operation controller 101 (step S1108). Alternatively, instead of sending all the collected data after completing the inspection, the data collected may be sent to the inspection operation controller 101 in parts during the inspection.

At step S1110, it is determined if there is any other target area in the inspection objective. If the inspection objective includes another target area of the exterior of a building, the process 1100 returns to step S1104 to start a new inspection. If no other target area is included, the process 1100 proceeds to step S1112 where the drone 102 moves back to the start location.

Figure 12:
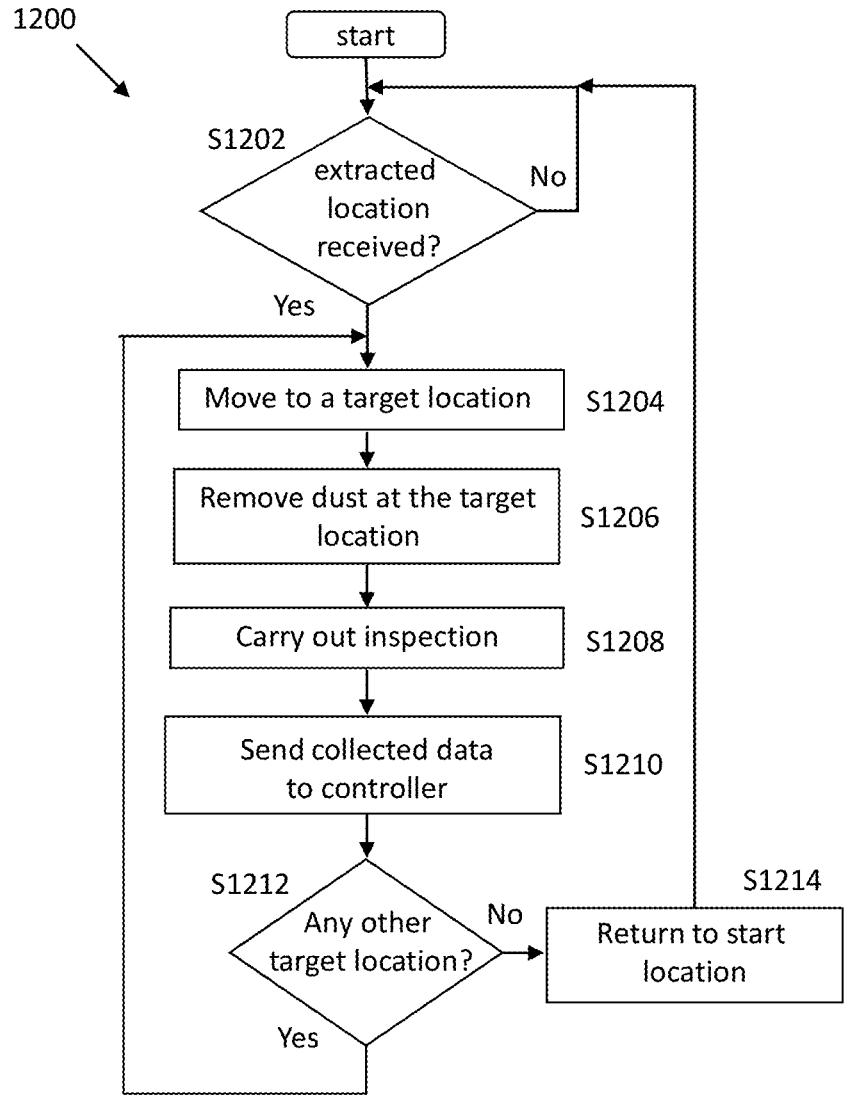
FIG. 12 is a flowchart of a robot exterior inspection process according to one embodiment.

FIG. 12 is a flowchart of a robot exterior inspection process 1200 according to one embodiment. The robot exterior inspection process 1200 is a process to be performed by the robot 103 when the robot 103 inspects the exterior of the building 410. In other words, the robot exterior inspection process 1200 is performed by the robot 103 between step S314 and step S316 of the inspection control process 300 illustrated in FIG. 3.

First, in the robot exterior inspection process 1200, the robot 103 is kept on standby at a start location. When the robot 103 receives one or more extracted locations where close inspection is desirable from the inspection operation controller 101 (Yes at step S1202), the process 1200 proceeds to step S1204. The extracted locations are sent from the inspection operation controller 101 to the robot 103 at step S314 of the inspection control process 300 illustrated in FIG. 3.

Having received the extracted locations, the robot 103 moves to one of the extracted locations where close inspection is desirable (hereinafter, referred to as a target location) (step S1204). At the target location, the robot 103 first performs the dust removing operation to blow off any sand particles or the like attached to the surface of the exterior of a building (step S1206). After completing the dust removing operation at step S1206, the robot 103 carries out one or more close inspections (step S1208). The close inspections may include, for example, taking pictures from close distance using the camera unit 103g, carrying out an ultrasonic inspection using an ultrasonic inspection device, carrying out a hammer test using a hammer testing device, and the like.

When the inspection is completed, data collected during the inspection is sent from the robot 103 to the inspection operation controller 101 (step S1210). Alternatively, instead of sending all the collected data after completing the inspection, the data collected may be sent to the inspection operation controller 101 in parts during the inspection. At step S1212, it is determined if there is any other target location to be closely inspected. If there is another target location, the process 1200 returns to step S1204 to start a new inspection. If there is no other target location, the process 1200 proceeds to step S1214 where the robot 103 moves back to the start location.

Next, the setup and operation of the building quality inspection system 100 for indoor (building interior) inspection according to one embodiment is described. As described above, the robot 103 for exterior inspection is configured in such a way that the robot body 103*a* and the hanging unit 103*b* form the robot 103 when the protruded fitting portion 1031 of the hanging unit 103*b* is fit into the robot body 103*a*. In the present embodiment, the robot 103 is configured in such a way that the robot 103 may also be used for inspecting the indoor of a building. Specifically, the robot 103 for exterior inspection illustrated in FIG. 6 can be transformed into a robot 103 for indoor inspection.

Figure 14:
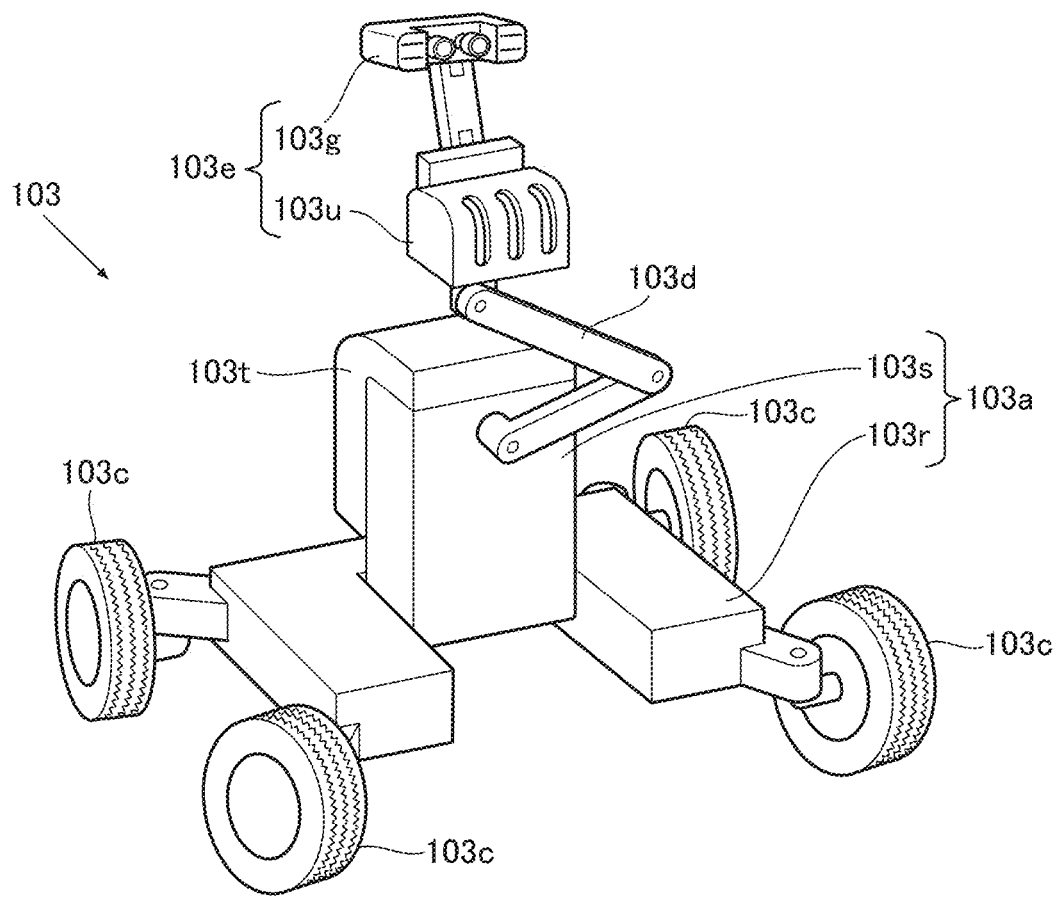
FIG. 14 is a perspective view of a robot for indoor inspection according to one embodiment.

FIG. 13A and FIG. 13B are schematic diagrams illustrating how the robot 103 for exterior inspection is transformed into the robot for indoor inspection. FIG. 14 is a perspective view of the robot 103 for indoor inspection according to one embodiment. As illustrated in FIG. 13A, first, the robot body 103*a* and the hanging unit 103*b* are separated by removing the protruded fitting portion 1031 from the robot body 103*a*, and the wall inspection unit 103*h* is removed from the inspection sensor unit 103*e*.

In the present embodiment, the robot body 103*a* has a foldable portion that can be folded or lifted with respect to a plane on which the robot 103 is moving. As illustrated in FIG. 14, the robot body 103*a* includes a base portion 103*r* having approximately a letter "C" shape and a foldable portion 103*s* pivotally mounted on the base portion 103*r*. The foldable portion 103*s* can be lifted to a vertical position and folded to a horizontal position by turning the foldable portion 103*s* about a non-illustrated rotation axis with respect to the base portion 103*r*.

After separating the hanging unit 103*a* and removing the wall inspection unit 103*h*, as illustrated in FIG. 13B, the robot 13 is placed on a flat place with the four wheels 103*c*, and the foldable portion 103*s* is lifted from the base portion 103*r*. Further, a power source 103*t* such as a battery is mounted on upper back part of the foldable portion 103*s* for longer operation time, and a sensor package 103*u* for indoor inspection is installed in the inspection sensor unit 103*e*. This completes the transformation of the robot 103 for exterior inspection into the robot 103 for indoor inspection illustrated in FIG. 14.

The robot 103 for indoor inspection illustrated in FIG. 14 is an autonomous self-propelled robot that is driven by the wheels 103*c* while holding the inspection sensor unit 103*e* including the camera unit 103*g* and the sensor package 103*u* with the holding arm 103*d*. This configuration enables the robot 103 for indoor inspection to move to a target room of a building, measures environmental conditions of the target room at a specific height from a room floor with the sensor package 103*u* attached to the holding arm 103*d*, and sends measurement results to the inspection operation controller 101 via the network 105.

Figure 15:
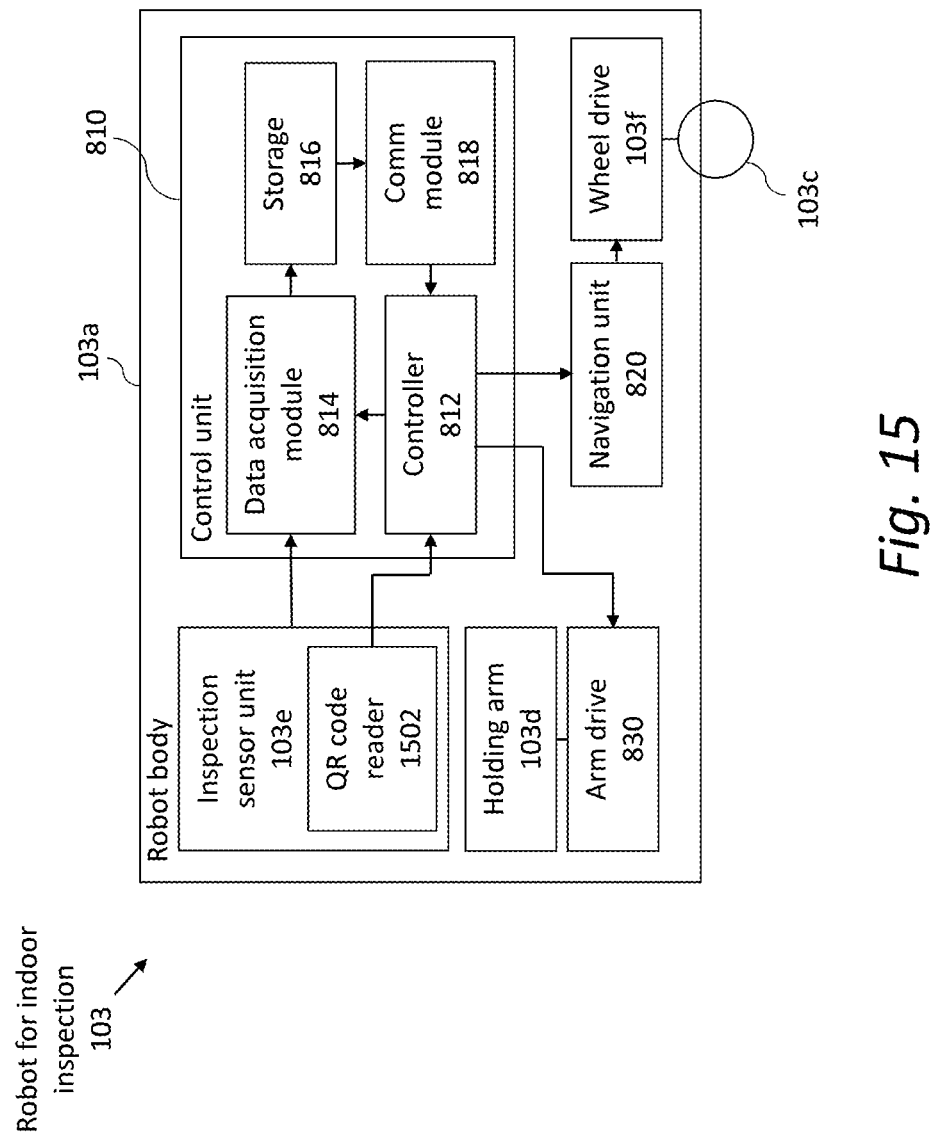
FIG. 15 is a block diagram of the robot for indoor inspection according to one embodiment.

FIG. 15 is a block diagram of the robot 103 for indoor inspection according to one embodiment. The configuration of the robot 103 for indoor inspection is substantially the same as that of the robot 103 for exterior inspection illustrated in FIG. 8 but without the hanging unit 103*b*. That is, the configuration of the robot 103 for indoor inspection is the same as that of the robot body 103*a* of the robot 103 for exterior inspection except that a QR code reader 1502 is added to the inspection sensor unit 103*e*. The QR code reader 1502 reads a QR code displaced in a target room in a building.

In the present embodiment, for purpose of facilitating an indoor inspection, a QR code is displayed in a target room to inform the robot 103 of the function of the target room. The robot 103 reads this QR code and sets the height of the inspection sensors unit 103*e* in response to the function of the target room. This enables the measurement of parameters relating to human comfort at one or more heights that are more appropriately correspond to typical positions and actions of people in the room. The obtained function of the room is sent to the inspection operation controller 101.

The QR code reader 1502 may be any well-known device including an image capturing device for reading QR codes or may use the camera unit 103*g* to obtain an image of the QR code. Alternatively, the QR code reader 1502 may be attached on the surface of the robot body 103*a* provided that the position of the QR code reader can read a QR code displayed on a predetermined location of the target room.

Figure 16:
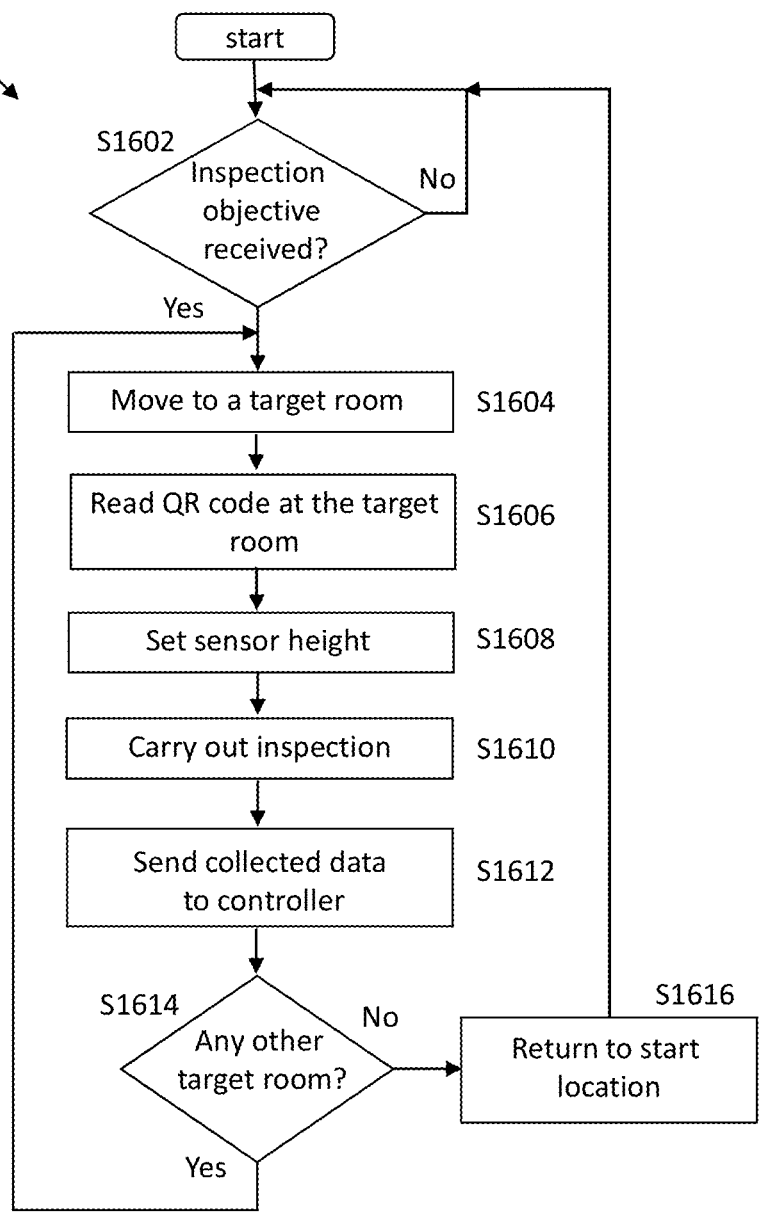
FIG. 16 is a flowchart of a robot indoor inspection process according to one embodiment.

Next, the operation of the robot 103 for indoor inspection is described in detail with reference to FIG. 16. FIG. 16 is a flowchart of a robot indoor inspection process 1600 according to one embodiment. In the present embodiment, it is assumed that a building has a plurality of rooms to be inspected, and a QR code indicating information on the function of the room is displayed at a predetermined location of each room. The QR code may be written on a plate, a card, or a sheet of paper, and that plate, card, or sheet of paper may be hanged or attached at a predetermined location on a wall of the room.

First, in the robot indoor inspection process 1600, the robot 103 is kept on standby at a start location. When the robot 103 receives an inspection objective from the inspection operation controller 101 (Yes at step S1602), the process 1600 proceeds to step S1604. The inspection objective includes one or more target rooms to be inspected in a building and is sent from the inspection operation controller 101 to the robot 103 at step S316 of the inspection control process 300 illustrated in FIG. 3.

Having received the inspection objective, the robot 103 moves to one of the one or more target rooms of a building (step S1604). At the target room, first, the robot 103 looks for a QR code in that target room and reads the QR code to obtain the function of the target room (step S1606). The function of a room means the purpose or the intended usage of the room and may be, for example, office, shop, café, class room, storage, and the like.

Next, the robot 103 sets the height of the inspection sensor unit 103*e* in response to the function of the target room obtained in step S1606 (step S1608) and carries out an inspection (step S1610). The setting of the height is achieved by controlling the position of the holding arm 103*d* on which the inspection sensor unit 103*e* is held. The inspection sensor unit 103*e* contains sensors to be used during the indoor inspection for measurement of parameters relating to human comfort in the room. The following table provides an example of such parameters. All the parameters or at least one of parameters in each human comfort category may be measured during indoor inspection.

TABLE 1

Parameters relating to human comfort

| Human comfort category | Parameter |
| --- | --- |
| Thermal Comfort | Ambient temperature |
| | Dry bulb temperature |
| | Radiant temperature |
| | Relative indoor humidity |
| | Wind speed |
| Visual Comfort | Illumination level |
| | Illumination color (CRI) |
| Aural comfort | Background noise |
| | Speaking level |
| Smell comfort | Dust level |
| | $O_2$ concentration |
| | $CO_2$ concentration |
| | CO concentration |
| | Methane level |
| | $H_2$ level |
| | Alcohol level |
| | Smoke level |
| | Liquefied gas fumes |
| | Formaldehyde gas and VOC level |
| | Ammonia level |
| | Ethanol and other gases |
| | Iso-butane and LNG gases |

The robot 103 retains a table that links the function of a room with one or more heights of the inspection sensor unit 103e and sets the height of the inspection sensor unit 103 or the position of the holding arm 103d accordingly. The table may be stored in the robot 103 in advance or may be included in the inspection objective sent from the inspection operation controller 101. An example of such table is provided below.

TABLE 2

Sensor height setting in indoor inspection

| Room Function | Sensor height |
| --- | --- |
| Office | Knee height (temperature only) |
| | Sitting person height |
| | Standup height |
| shop | Standup height |
| Cafe | Knee height (temperature only) |
| | Sitting person height |

For example, in the table 2, the function "office" is linked with a knee height (temperature only), a sitting person height, and a standup height. That is, the temperature is measured at the knee height, the sitting person height, and the standup height, and all the remaining parameters are measured at the sitting person height and the standup height. The measurement is repeated at different heights at the same location in the room.

Here, the knee height is a typical height of human knee from a room floor, the sitting person height is a typical height of human head from a room floor when a person is sitting on a chair or sofa, and the standup height is a typical height of human when a person is standing up. For example, in a case of a building where adult male and female workers work in United States, the knee height is approximately between 30 and 50 cm, the sitting person height is approximately between 120 and 140 cm, and the standup height is approximately between 160 and 180 cm. The exact height is determined in considering physical heights of majority of people in each target room and the range of movement of the holding arm 103d. Preferably, the actual values of these heights are scaled depending on an average height of majority of people in the room. For example, when a class room for smaller children in a school is to be inspected, the actual heights are reduced according to an average height of the smaller children.

In the present embodiment, the height of the inspection sensor unit 103e is determined as follows. In the indoor inspection of a building, human comfort is one of important factors in assessing quality of a building. Since many of major human sensory organs are concentrated and exposed at a human face, it is reasonable to measure environment conditions at the height where majority of people's heads are typically positioned when people are in the room. The typical positions of majority of human heads may be determined from movements and actions of people in the room, and the movements and actions of people in the room strongly related to the function of the room.

In an office, for example, many of people are engaged in deskwork, and some people stand up or walk around. Thus, measurement at the sitting person height and the standup height enables to provide a clearer picture of human comfort conditions in the room. On the other hand, temperature can be felt by any part of human body. It is known that office workers often feel uncomfortable when there is a mass of cool air stagnated near a floor due to lack of air circulation at an air-conditioned room. Thus, it is preferable to measure the temperature at different heights such as the knee height, the sifting person height, and the standup height to obtain a clearer picture of human comfort conditions relating to temperature.

The same reasoning may be applied to the other room function. For example, in a shop, most people are standing or walking. Thus, it is preferable to make a measurement at the standup height. In a café, most people are sitting on chairs or sofa. Thus, it is preferable to make measurements at the sitting person height and the knee height for temperature and make a measurement at the sifting person height for other remaining parameters.

In the present embodiment, all the measurement data of the same parameter at different heights are sent to the inspection operation controller 101 for data analysis. Alternatively, the measurement data of the same parameter in different heights may be averaged before sending them to the inspection operation controller 101. Further, the measurement described above may alternatively be repeated at different locations in the room, and all measurement data collected at different locations in the room may be send to the inspection operation controller 101 or averaged before sending them to the inspection operation controller 101

When the inspection is completed, measurement data collected during the inspection is sent from the robot 103 to the inspection operation controller 101 (step S1612). Alternatively, instead of sending all the collected data after completing the inspection, the data collected may be sent to the inspection operation controller 101 in parts during the inspection.

At step S1614, it is determined if there is any other target room need to be inspected. If there is another target room, the process 1600 returns to step S1604 to start a new inspection. If there is no other target location, the process 1600 proceeds to step S1616 where the robot 103 for indoor inspection moves back to the start location.

Figure 17:
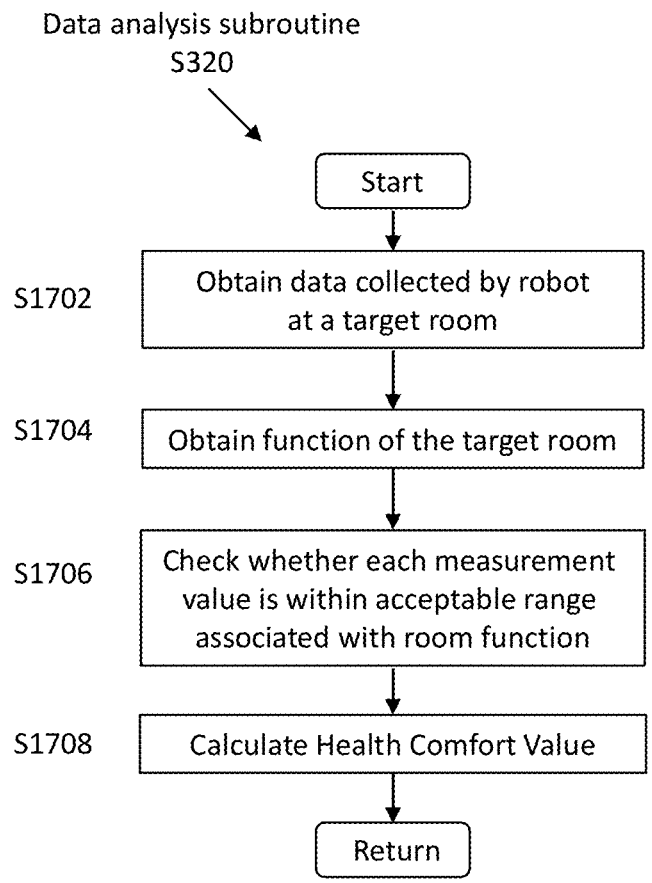
FIG. 17 is a flowchart of a data analysis subroutine according to one embodiment.

Next, an example of data analysis to be performed after the robot indoor inspection process 1600 is described. FIG. 17 is a flowchart of a data analysis subroutine according to one embodiment. This data analysis subroutine corresponds to step S320 of the inspection control process 300 illustrated in FIG. 3.

The data analysis subroutine S320 is performed by the inspection operation controller 101. The inspection operation controller 101 first obtains, for each target room inspected, the measurement data (step S1702) and the function of the room (step S1704). The measurement data and the function of the room are obtained by the robot 103 for indoor inspection and sent to the inspection operation controller 101. The received measurement data and the function of the room may be stored in the inspection operation controller 101 or in the database 104 via the network 105.

At step 1706, the inspection operation controller 101 checks, for each parameter, whether each measurement value falls within a corresponding acceptable range associated with the function of the room. If the measurement value is in the corresponding acceptable range, the inspection operation controller 101 determines the room as "comfort" with respect to the corresponding parameter. If the measurement value is outside the corresponding acceptable range, the inspection operation controller 101 determines the room as "discomfort" with respect to the corresponding parameter.

A table that lists acceptable ranges of parameter in relation to each function of the room is prepared in advanced and retained in the inspection operation controller 101 or stored in the database 104 and obtained via the network 105 in advance. In the present embodiment, the allowable range of each parameter is set differently for different functions of the room. For example, in an office, people stay in all day whereas in a shop people come and go in shorter period of time. Thus, even for the same parameter, a narrower allowable range is applied for an office whereas a wider allowable range is applied for a shop.

At step S1708, a health comfort value (=Visual comfort+Audio comfort+Thermal comfort+Smell comfort) is calculated. The human comfort value (HCV) is normalized to 1 when all the parameters in every category are determined as "comfort", that is, within the respective allowable ranges. Here, it is assumed "comfort" is counted 1 and "discomfort" is counted 0, and all the human comfort categories are equally weighted. The determination results of the measurement values of parameters obtained in step S1706 are summed and normalized to 0.25 for each comfort category. That is, when N number of parameters are measured in one human comfort category, and M (<N) number of parameters are determined as "comfort" in that human comfort category, the score of this comfort category is given by (M/N)×0.25. The results of four comfort categories are summed to obtain the HCV.

Subsequently, the process proceeds to step S322 of FIG. 3, and the calculated HCV of each room that has been inspected are outputted to a user on the user interface 202 or the user terminal 106 via the network 105. Quality of the target room may be indicated as "acceptable" if the calculated HCV is equal to or greater than 0.8 and indicated as "unacceptable" if the calculated HCV is less than 0.8.

An exemplary hardware description of the inspection operation controller 101 for performing one or more of the embodiments described herein is described with reference to FIG. 18. In addition, the hardware described by FIG. 18 can also apply to circuitry associated with the control unit 810 of the robot 103 and the user device 106.

The inspection operation controller 101 includes a CPU 1800 that perform the processes described herein. The process data and instructions may be stored in memory 1802. These processes and instructions may also be stored on a storage medium disk 1804 such as a hard drive (HDD) or portable storage medium or may be stored remotely. Note that each of the functions of the described embodiments may be implemented by one or more processing circuits. A processing circuit includes a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the inspection operation controller 101 communicates, such as the database 104.

Further, the claimed advancements may be provided as a utility application, background daemon, or component of an operating system, or combination thereof, executing in conjunction with CPU 1800 and an operating system such as Microsoft Windows, UNIX, Solaris, LINUX, Apple MAC-OS and other systems known to those skilled in the art.

CPU 1800 may be a Xenon or Core processor from Intel of America or an Opteron processor from AMD of America, or may be other processor types that would be recognized by one of ordinary skill in the art. Alternatively, the CPU 1800 may be implemented on an FPGA, ASIC, PLD or using discrete logic circuits, as one of ordinary skill in the art would recognize. Further, CPU 1800 may be implemented as multiple processors cooperatively working in parallel to perform the instructions of the inventive processes described above.

Figure 18:
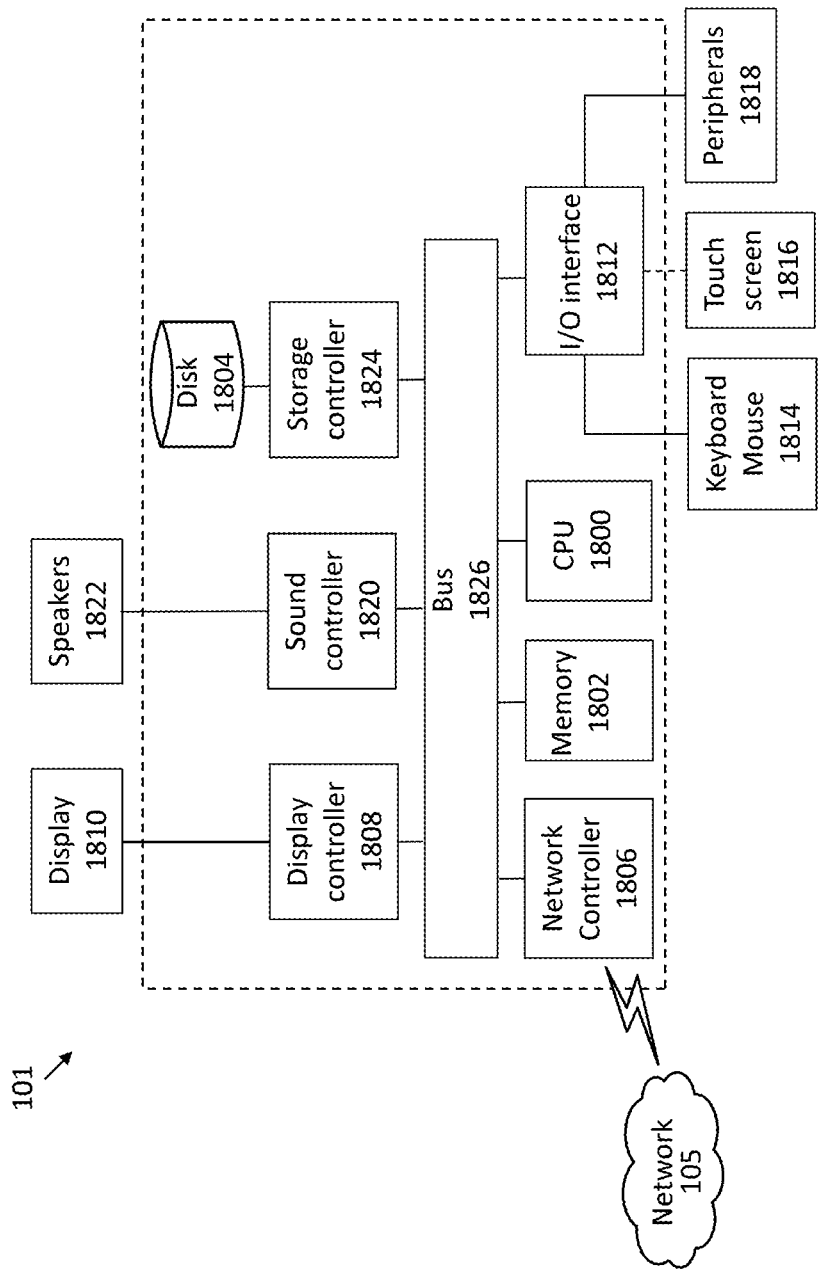
FIG. 18 is an illustration of a non-limiting example of inspection operation controller circuitry according to one embodiment.

The inspection operation controller 101 in FIG. 18 also includes a network controller 1806, such as an Intel Ethernet PRO network interface card from Intel Corporation of America, for interfacing with network 105. As can be appreciated, the network 105 can be a public network, such as the Internet, or a private network such as an LAN or WAN network, or any combination thereof and can also include PSTN or ISDN sub-networks. The network 105 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The inspection operation controller 101 further includes a display controller 1808, such as a NVIDIA GeForce GTX or Quadro graphics adaptor from NVIDIA Corporation of America for interfacing with display 1810 of the inspection operation controller 101 such as an LCD monitor. A general purpose I/O interface 1812 at the inspection operation controller 101 interfaces with a keyboard and/or mouse 1814 as well as a touch screen panel 1816 on or separate from display 1810. General purpose I/O interface 1812 also connects to a variety of peripherals 1818 including printers and scanners.

A sound controller 1820 is also provided in the inspection operation controller 101, such as Sound Blaster X-Fi Titanium from Creative, to interface with speakers/microphone 1822 thereby providing sounds and/or music.

The general-purpose storage controller 1824 connects the storage medium disk 1804 with communication bus 1826, which may be an ISA, EISA, VESA, PCI, or similar, for interconnecting all of the components of the inspection operation controller 101. A description of the general features and functionality of the display 1810, keyboard and/or mouse 1814, as well as the display controller 1808, storage controller 1824, network controller 1806, sound controller 1820, and general purpose I/O interface 1812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein. In other alternate embodiments, processing features according to the present disclosure may be implemented and commercialized as hardware, a software solution, or a combination thereof.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A building quality inspection system comprising:
at least one unmanned aerial drone configured to fly around a building exterior, each drone including a first navigation unit, a first communication unit, a first control unit, a drone body, four propeller support arms extending in four directions from the drone body, four motors attached to top end portions of the propeller support arms, and four propellers mounted on the four motors, a first stereoscopic camera configured to record a first set of three dimensional (3D) visible and near-infrared images of the building exterior, the stereoscopic camera including a mechanism configured to switch an infrared-cut filter into and out of an optical path of the stereoscopic camera, a first visible lighting source configured to illuminate the building exterior when recording visible light images, and a near-infrared lighting source configured to illuminate the building exterior when recording near-infrared images;
at least one unmanned self-propelled surface-based robot, each robot communicably connected to at least one drone, wherein each robot includes a second navigation unit, a second communication unit, a second control unit, a base portion with wheels for movement, at least one inspection sensor configured to measure one or more parameters, the at least one inspection sensor including an ultrasonic tester, a second visible lighting source, a second stereoscopic camera configured to record a second set of three dimensional (3D) visible and near-infrared images of the building exterior, and a foldable portion pivotally mounted on the base portion, a holding arm attached to the foldable portion, the inspection sensor being mounted on the holding arm, the holding arm including a motorized rotary joint, wherein the second control unit is to configured to control the motorized rotary joint to position the inspection sensor three dimensionally with respect to an exterior surface of the building;
an inspection controller including a third communication module communicatively coupled with each drone and each robot, wherein the inspection controller includes circuitry and a non-transitory computer readable medium having instructions stored therein that, when executed by one or more processors, cause the one or more processors to implement an inspection control process configured to:
receive a first order to inspect an exterior of the building;
in response to receiving the first order:
send a first inspection objective to least one drone to instruct the drone to carry out an aerial visual inspection of the exterior of the building and the exterior environment of the building;
receive first inspection data collected by the drone during the aerial visual inspection;
extract an exterior surface location on the building where damage and/or an environmental anomaly is suspected from the first inspection data;
in response to extracting the exterior surface location where the damage and/or an environmental anomaly is suspected, send a second inspection objective and the exterior surface location to a first robot to carry out an exterior surface inspection at the exterior surface location, the exterior surface inspection including at least an ultrasonic test;
receive second inspection data collected by the first robot during the exterior surface inspection;
determine whether damage and/or an environment anomaly exists at the exterior surface location from the first inspection data and the second inspection data;
in response to determining that damage and/or an environment anomaly exists at the exterior surface location,
send a third inspection objective to a second robot to carry out a third inspection of an interior location inside the building corresponding to the exterior surface location where damage exists;

receive third inspection data collected by the second robot during the third inspection;

determine a current quality of the exterior of the building and a human comfort value of the interior of the building at the location of the damage or anomaly based on the first, second and third inspection data; and receive a second order to inspect the interior of the building:

in response to receiving the second order:
send a fourth inspection objective to the second robot to instruct the second robot to carry out a fourth inspection of the interior of the building;
receive fourth inspection data collected by the second robot during the fourth inspection; and
determine the current quality of the interior of the building based on the fourth inspection data.

2. The system according to claim 1, wherein the inspection objectives include geolocation data and structural data of the building.

3. The system according to claim 1, wherein the inspection controller is further configured to obtain coordinates on the building known to be prone to damage and/or an environmental anomaly from past inspection results and send the coordinates to the first robot as the exterior surface location where the damage and/or the environmental anomaly on the exterior surface of the building is suspected.

4. The system according to claim 1, wherein,
when the exterior of the building is inspected,
the first robot moves on the surface of the building exterior, and
the foldable portion of the robot is folded in such a way that the exterior surface of the building is reachable by the inspection sensor.

5. The system according to claim 1, wherein the ultrasonic tester includes a hammer configured to hit the exterior surface of the building to generate sound waves and a receiver configured to detect the sound waves.

6. The system according to claim 4, wherein
the first robot further includes a detachable hanging unit including a plurality of blowers, the detachable hanging unit fitting above the foldable portion that has been folded against the base portion, the detachable hanging unit connected to a cable attached to a crane unit located on a roof of the building, such that the robot is suspended from above by the cable, wherein the plurality of blowers are configured to blow air to press the robot against a vertical wall of the exterior surface of the building;
the second robot includes a battery mounted on a back of the foldable portion;
the inspection sensor of the second robot further includes an environmental sensor package configured to measure thermal comfort, visual comfort, aural comfort and smell comfort;
the motorized rotary joint is configured to position the environmental sensor package at different heights in the interior of the building; and
a configuration of the first robot is converted to a configuration of the second robot by lifting the detachable hanging unit from the first robot, installing the battery on the back of the foldable portion of the first robot and installing the environmental sensor package on the first robot.

7. The system according to claim 4, wherein the first robot further includes a dust removing mechanism for blowing air onto the exterior surface of the building to remove dust and/or sand attached on the exterior surface of the building before starting measurement with the inspection sensor.

8. The system according to claim 6, wherein the first robot blows air onto the exterior surface of the building by switching at least one of the plurality of blowers to reverse rotation to remove dust and/or sand attached on the exterior surface of the building.

9. The system according to claim 1, wherein each robot further includes a holding arm that holds the inspection sensor at a first end and is attached to the foldable portion at a second end, the holding arm being configured to hold the inspection sensor at different positions with respect to the base portion.

10. The system according to claim 9, wherein,
the second robot further includes a QR code reader;
the third and fourth inspection objections instruct the second robot to:
detect one or more of rooms of the building where a QR code indicating a function of the room is displayed;
read each QR code to obtain the function of the room; and
lift the foldable portion of the second robot in such a way that height of the inspection sensor held by the holding arm is varied in response to the function of the room obtained.

11. The system according to claim 9, wherein the inspection sensor measures at least one of parameter associated with each of thermal comfort, visual comfort, aural comfort, and smell comfort.

12. The system according to claim 1, wherein the wheels are mounted on the base portion in such a way that directions of the wheels are changeable.

13. The system according to claim 1, wherein the inspection sensor is detachably mounted on the foldable portion and is a first inspection sensor including one or more sensors for inspection of the exterior surface of the building or a second inspection sensor including one or more sensors for inspection of the interior of the building.

14. The system according to claim 10, wherein, when the interior of the building is inspected, a detachable power source is attached to each robot whose foldable portion is lifted.

* * * * *